United States Patent
Saggar et al.

(10) Patent No.: US 12,262,332 B2
(45) Date of Patent: Mar. 25, 2025

(54) SIGNALING A POWER OFFSET BETWEEN REFERENCE AND DATA TONES

(71) Applicant: QUALCOMM Incorporated, San Diego, CA (US)

(72) Inventors: Hemant Saggar, San Diego, CA (US); Iyab Issam Sakhnini, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 17/853,695

(22) Filed: Jun. 29, 2022

(65) Prior Publication Data

US 2024/0007971 A1   Jan. 4, 2024

(51) Int. Cl.
*H04W 52/36* (2009.01)
*H04L 27/26* (2006.01)

(52) U.S. Cl.
CPC ....... *H04W 52/367* (2013.01); *H04L 27/2607* (2013.01); *H04W 52/36* (2013.01)

(58) Field of Classification Search
CPC ...... H04B 7/208; H04B 7/212; H04B 7/2123; H04B 7/2615; H04B 7/2618;
(Continued)

(56) References Cited

U.S. PATENT DOCUMENTS

| | | | | |
|---|---|---|---|---|
| 2012/0106490 A1* | 5/2012 | Nakashima | ........... | H04W 52/42 370/329 |
| 2014/0086203 A1* | 3/2014 | Furuskar | ............... | H04L 5/0048 370/330 |

(Continued)

FOREIGN PATENT DOCUMENTS

| | | | | |
|---|---|---|---|---|
| CA | 3065550 A1 * | 12/2018 | ........... | H04L 5/0094 |
| WO | WO-2013082549 A1 * | 6/2013 | ............ | H04W 52/08 |

OTHER PUBLICATIONS

CATT: "On DMRS Design for DL", 3GPP TSG RAN WG1 Meeting #90, R1-1712383, 3GPP, Mobile Competence Centre, 650, Route Des Lucioles, F-06921 Sophia-antipolis Cedex, France, vol. RAN WG1, No. Prague, Czechia, Aug. 21, 2017-Aug. 25, 2017, 7 Pages, Aug. 20, 2017, XP051315199, Section 2.3.

(Continued)

*Primary Examiner* — Young T. Tse

(74) *Attorney, Agent, or Firm* — QUALCOMM IP DEPT.; James Hunt Yancey, Jr.

(57) ABSTRACT

Methods, systems, and devices for wireless communications are described. A user equipment (UE) may establish, with a network entity, a wireless connection that uses a set of symbols per transmission time interval (TTI) for orthogonal frequency division multiplexing (OFDM) communications, where each symbol of the set of symbols may correspond to a fast Fourier transform (FFT) window and may include a guard interval (GI) portion and a data portion within the FFT window. In some examples, the UE may receive a control message indicating at least one parameter associated with a power offset between a data signal of the set of symbols and a reference signal of the set of symbols that is associated with the data signal. As such, the UE may communicate with the network entity, the data signal, and the reference signal according to the indicated power offset using the set of symbols.

30 Claims, 19 Drawing Sheets

(58) Field of Classification Search
CPC . H04B 7/2621; H04B 7/2628; H04L 27/2607;
H04L 27/265; H04L 27/26524; H04W
52/18; H04W 52/225; H04W 52/36;
H04W 52/367; H04W 52/54
USPC ........ 375/259, 260, 267; 370/208, 210, 328,
370/330, 335–337, 342–344; 455/517,
455/522
See application file for complete search history.

(56) References Cited

U.S. PATENT DOCUMENTS

| | | | |
|---|---|---|---|
| 2019/0150097 A1* | 5/2019 | Seo ..................... | H04W 52/14 370/329 |
| 2019/0379488 A1 | 12/2019 | Demir et al. | |
| 2022/0070793 A1* | 3/2022 | Raghavan ............ | H04B 17/327 |
| 2023/0345378 A1* | 10/2023 | Abotabl .............. | H04W 52/143 |

OTHER PUBLICATIONS

International Search Report and Written Opinion—PCT/US2023/067680—ISA/EPO—Sep. 21, 2023.

* cited by examiner

US 12,262,332 B2

SIGNALING A POWER OFFSET BETWEEN REFERENCE AND DATA TONES

FIELD OF TECHNOLOGY

The following relates to wireless communications, including signaling a power offset between reference and data tones.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support signaling a power offset between reference and data tones. For example, the described techniques provide for a network entity and a user equipment (UE) to communicate additional signaling to clarify the power offset between different symbol types for channel estimation. For example, the network entity may transmit a control signal (e.g., via downlink control information (DCI), a medium access control-control element (MAC-CE), or a radio resource control signal (RRC)) that indicates a power backoff to use for a data symbol with reference to a defined reference symbol (e.g., a demodulation reference signal (DMRS) symbol associated with the data symbol). In some examples, when configured with the control signal, the UE may back off transmit power for a set of data symbols to meet an average transmission power threshold configured by the network or in accordance with a UE capability.

Additionally, or alternatively, if the network entity configures a symbol type in downlink and the average and/or variance of the distribution of the associated power backoff surpasses a power backoff threshold, the network may transmit an average power offset for use in accordance with a given symbol type. Additionally or alternatively to the average power offset, the network entity may also signal a variance distribution of the power offset across symbols. In some cases, the network entity may signal a power offset on a per symbol basis. In some cases, the network entity may transmit a signal indicating a threshold allowed power offset for each symbol type, such that the UE may not exceed the allowed power threshold in communications of the associated symbol type.

A method for wireless communications at a user equipment (UE) is described. The method may include establishing, with a network entity, a wireless connection that uses a set of symbols per transmission time interval (TTI) for orthogonal frequency division multiplexing (OFDM) communications, where each symbol of the set of symbols corresponds to a fast Fourier transform (FFT) window and includes a guard interval (GI) portion and a data portion within the FFT window, receiving a control message indicating at least one parameter associated with a power offset between a data signal of the set of symbols and a reference signal of the set of symbols that is associated with the data signal, and communicating, with the network entity, the data signal and the reference signal according to the indicated power offset using the set of symbols.

An apparatus for wireless communications at a UE is described. The apparatus may include a processor, memory coupled with the processor, and instructions stored in the memory. The instructions may be executable by the processor to cause the apparatus to establish, with a network entity, a wireless connection that uses a set of symbols per TTI for OFDM communications, where each symbol of the set of symbols corresponds to a FFT window and includes a GI portion and a data portion within the FFT window, receive a control message indicating at least one parameter associated with a power offset between a data signal of the set of symbols and a reference signal of the set of symbols that is associated with the data signal, and communicate, with the network entity, the data signal and the reference signal according to the indicated power offset using the set of symbols.

Another apparatus for wireless communications at a UE is described. The apparatus may include means for establishing, with a network entity, a wireless connection that uses a set of symbols per TTI for OFDM communications, where each symbol of the set of symbols corresponds to a FFT window and includes a GI portion and a data portion within the FFT window, means for receiving a control message indicating at least one parameter associated with a power offset between a data signal of the set of symbols and a reference signal of the set of symbols that is associated with the data signal, and means for communicating, with the network entity, the data signal and the reference signal according to the indicated power offset using the set of symbols.

A non-transitory computer-readable medium storing code for wireless communications at a UE is described. The code may include instructions executable by a processor to establish, with a network entity, a wireless connection that uses a set of symbols per TTI for OFDM communications, where each symbol of the set of symbols corresponds to a FFT window and includes a GI portion and a data portion within the FFT window, receive a control message indicating at least one parameter associated with a power offset between a data signal of the set of symbols and a reference signal of the set of symbols that is associated with the data signal, and communicate, with the network entity, the data signal and the reference signal according to the indicated power offset using the set of symbols.

In some examples of the method, apparatuses, and non-transitory computer-readable medium described herein, communicating the data signal and the reference signal may include operations, features, means, or instructions for transmitting the reference signal using a first transmit power and transmitting the data signal using a second transmit power that may be based on the indicated power offset, where the first transmit power and the second transmit power satisfy a maximum transmit power threshold.

In some examples of the method, apparatuses, and non-transitory computer-readable medium described herein, the power offset includes a first power offset and the method, apparatuses, and non-transitory computer-readable medium may include further operations, features, means, or instructions for receiving a second control message indicating at least one parameter associated with a second power offset associated with a symbol type that includes the data signal, the second power offset between the data signal of the symbol type and the reference signal that may be associated with the data signal and receiving, from the network entity, the data signal and the reference signal according to the second indicated power offset.

In some examples of the method, apparatuses, and non-transitory computer-readable medium described herein, the at least one parameter associated with the power offset includes a first power offset and the method, apparatuses, and non-transitory computer-readable medium may include further operations, features, means, or instructions for receiving a second control message indicating an average power offset and statistical information associated with power offsets across the set of symbols within a fixed duration for the wireless connection and receiving the data signal and the reference signal based on the average power offset and the statistical information.

Some examples of the method, apparatuses, and non-transitory computer-readable medium described herein may further include operations, features, means, or instructions for receiving, for the TTI, one or more control signals indicating a power offset for the data signal of the set of symbols relative to an associated reference signal.

In some examples of the method, apparatuses, and non-transitory computer-readable medium described herein, receiving the one or more control signals may include operations, features, means, or instructions for receiving, for each symbol of the set of symbols, a control signal of the one or more control signals indicating an associated power offset for the symbol.

In some examples of the method, apparatuses, and non-transitory computer-readable medium described herein, the control signal includes a reference signal multiplexed in frequency or time with the data signal on a shared channel.

In some examples of the method, apparatuses, and non-transitory computer-readable medium described herein, the control signal may be multiplexed in frequency or time with the data signal on a shared channel.

In some examples of the method, apparatuses, and non-transitory computer-readable medium described herein, receiving the one or more control signals may include operations, features, means, or instructions for receiving one control signal indicating a power offset applicable for the set of symbols of the TTI.

Some examples of the method, apparatuses, and non-transitory computer-readable medium described herein may further include operations, features, means, or instructions for receiving a second control message indicating a power offset threshold associated with a symbol type that includes the data signal, where the data signal and the reference signal may be communicated according to the power offset using the set of symbols based on the power offset satisfying the power offset threshold.

Some examples of the method, apparatuses, and non-transitory computer-readable medium described herein may further include operations, features, means, or instructions for receiving a set of control messages indicating a respective set of power offsets, each power offset associated with a different symbol type of a set of symbol types, where the data signal may be a first symbol type of the set of symbol types and the power offset may be a first power offset of the set of power offsets that may be associated with the first symbol type.

In some examples of the method, apparatuses, and non-transitory computer-readable medium described herein, the reference signal includes a demodulation reference signal, and the set of symbol types include one or more of signals of a physical downlink shared channel (PDSCH), signals of a physical downlink control channel (PDCCH), signals of a physical uplink shared channel (PUSCH), signals of a physical uplink control channel (PUCCH), position reference signals (PRSs), or channel state information reference signals (CSI-RSs).

In some examples of the method, apparatuses, and non-transitory computer-readable medium described herein, receiving the control message indicating the at least one parameter associated with the power offset may include operations, features, means, or instructions for receiving an indication of whether the UE may be to use the power offset between the data signal and the reference signal associated with the data signal.

In some examples of the method, apparatuses, and non-transitory computer-readable medium described herein, receiving the control message may include operations, features, means, or instructions for receiving downlink control information (DCI), a medium access control control element (MAC-CE), a radio resource control (RRC) signal, or a combination thereof.

In some examples of the method, apparatuses, and non-transitory computer-readable medium described herein, the data signal includes data tones in data symbols within the set of symbols and the reference signal includes reference tones in reference symbols within the set of symbols, the reference symbols associated with the data symbols.

A method for wireless communications at a network entity is described. The method may include establishing, with a UE, a wireless connection that uses a set of symbols per TTI for OFDM communications, where each symbol of the set of symbols corresponds to a FFT window and includes a GI portion and a data portion within the FFT window, transmitting a control message indicating at least one parameter associated with a power offset between a data signal of the set of symbols and a reference signal of the set of symbols that is associated with the data signal, and communicating, with the UE, the data signal and the reference signal according to the indicated power offset using the set of symbols.

An apparatus for wireless communications at a network entity is described. The apparatus may include a processor, memory coupled with the processor, and instructions stored in the memory. The instructions may be executable by the processor to cause the apparatus to establish, with a UE, a wireless connection that uses a set of symbols per TTI for OFDM communications, where each symbol of the set of symbols corresponds to a FFT window and includes a GI portion and a data portion within the FFT window, transmit a control message indicating at least one parameter associated with a power offset between a data signal of the set of symbols and a reference signal of the set of symbols that is associated with the data signal, and communicate, with the UE, the data signal and the reference signal according to the indicated power offset using the set of symbols.

Another apparatus for wireless communications at a network entity is described. The apparatus may include means for establishing, with a UE, a wireless connection that uses a set of symbols per TTI for OFDM communications, where each symbol of the set of symbols corresponds to a FFT window and includes a GI portion and a data portion within the FFT window, means for transmitting a control message indicating at least one parameter associated with a power offset between a data signal of the set of symbols and a reference signal of the set of symbols that is associated with the data signal, and means for communicating, with the UE, the data signal and the reference signal according to the indicated power offset using the set of symbols.

A non-transitory computer-readable medium storing code for wireless communications at a network entity is described. The code may include instructions executable by a processor to establish, with a UE, a wireless connection that uses a set of symbols per TTI for OFDM communications, where each symbol of the set of symbols corresponds to a FFT window and includes a GI portion and a data portion within the FFT window, transmit a control message indicating at least one parameter associated with a power offset between a data signal of the set of symbols and a reference signal of the set of symbols that is associated with the data signal, and communicate, with the UE, the data signal and the reference signal according to the indicated power offset using the set of symbols.

In some examples of the method, apparatuses, and non-transitory computer-readable medium described herein, communicating the data signal and the reference signal may include operations, features, means, or instructions for receiving the reference signal using a first transmit power and receiving the data signal using a second transmit power that may be based on the indicated power offset, where the first transmit power and the transmit power satisfy an average transmit power threshold.

In some examples of the method, apparatuses, and non-transitory computer-readable medium described herein, the power offset includes a first power offset and the method, apparatuses, and non-transitory computer-readable medium may include further operations, features, means, or instructions for transmitting a second control message indicating at least one parameter associated with a second power offset associated with a symbol type that includes the data signal, the second power offset between the data signal of the symbol type and the reference signal that may be associated with the data signal; and receiving, from the UE, the data signal and the reference signal according to the second indicated power offset.

In some examples of the method, apparatuses, and non-transitory computer-readable medium described herein, the at least one parameter associated with the power offset includes a first power offset and the method, apparatuses, and non-transitory computer-readable medium may include further operations, features, means, or instructions for transmitting a second control message indicating an average power offset and statistical information associated with power offsets across the set of symbols within a fixed duration for the wireless connection and transmitting the data signal and the reference signal based on the average power offset and the statistical information.

Some examples of the method, apparatuses, and non-transitory computer-readable medium described herein may further include operations, features, means, or instructions for transmitting, for the TTI, one or more control signals indicating a power offset for the data signal of the set of symbols relative to an associated reference signal.

In some examples of the method, apparatuses, and non-transitory computer-readable medium described herein, transmitting the one or more control signals may include operations, features, means, or instructions for transmitting, for each symbol of the set of symbols, a control signal of the one or more control signals indicating an associated power offset for the symbol.

In some examples of the method, apparatuses, and non-transitory computer-readable medium described herein, transmitting the one or more control signals may include operations, features, means, or instructions for transmitting one control signal indicating a power offset applicable for the set of symbols of the TTI.

Some examples of the method, apparatuses, and non-transitory computer-readable medium described herein may further include operations, features, means, or instructions for transmitting a second control message indicating a power offset threshold associated with a symbol type that includes the data signal, where the data signal and the reference signal may be communicated according to the power offset using the set of symbols based on the power offset satisfying the power offset threshold.

Some examples of the method, apparatuses, and non-transitory computer-readable medium described herein may further include operations, features, means, or instructions for transmitting a set of control messages indicating a respective set of power offsets, each power offset associated with a different symbol type of a set of symbol types, where the data signal may be a first symbol type of the set of symbol types and the power offset may be a first power offset of the set of power offsets that may be associated with the first symbol type.

In some examples of the method, apparatuses, and non-transitory computer-readable medium described herein, transmitting the control message indicating the at least one parameter associated with the power offset may include operations, features, means, or instructions for transmitting an indication of whether the UE may be to use the power offset between the data signal and the reference signal associated with the data signal.

DETAILED DESCRIPTION

Figure 1:
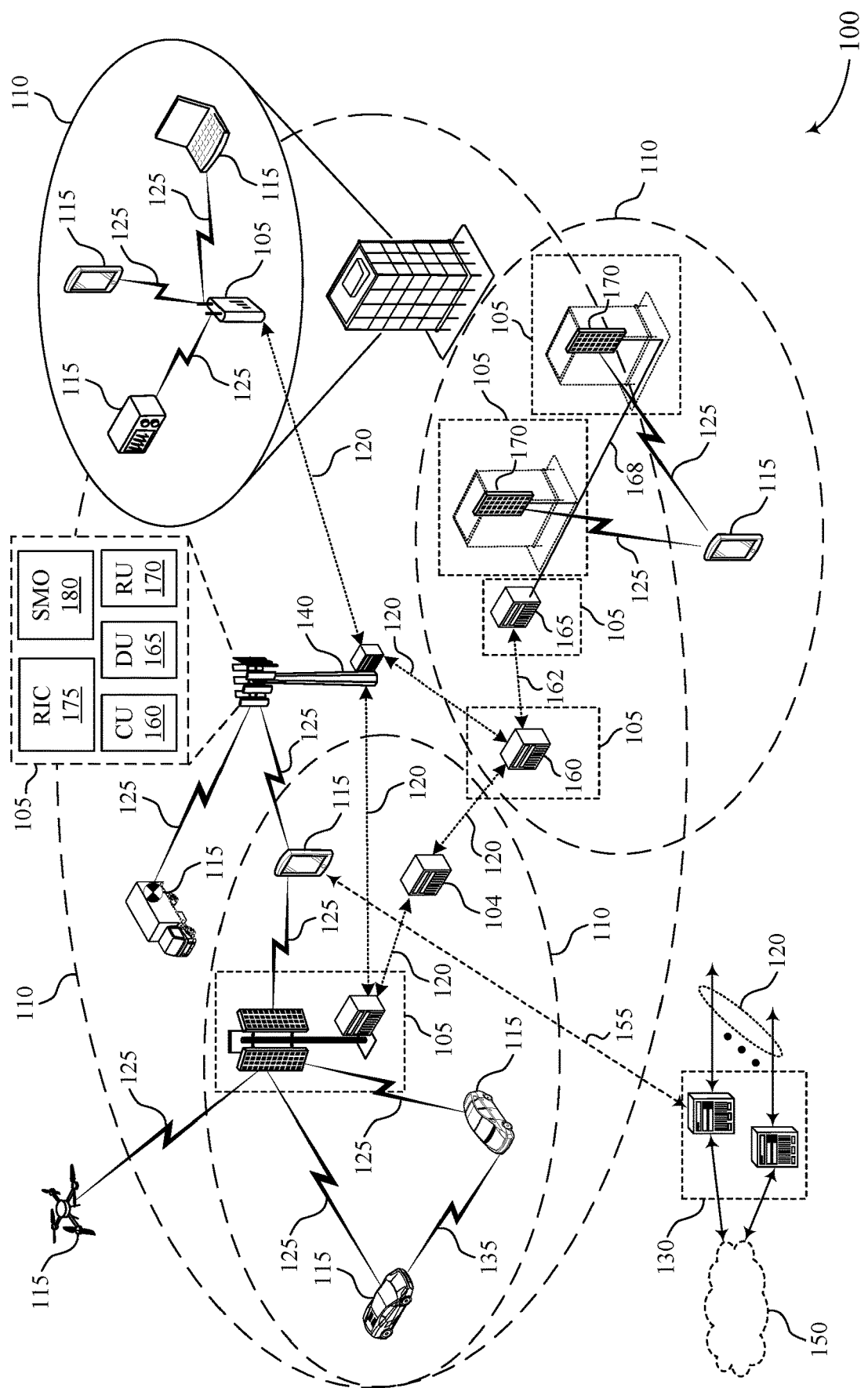
FIG. 1 illustrates an example of a wireless communications system that supports signaling a power offset between reference and data tones in accordance with one or more aspects of the present disclosure.

In some examples of wireless communications a user equipment (UE) and a network entity may communicate in accordance with unique word orthogonal frequency division multiplexing (UW-OFDM). In such examples, a given transmission time interval (TTI) may include a set of OFDM symbols, where each OFDM symbol may be associated with a fast Fourier transform (FFT) window that includes a guard interval (GI) portion and a data portion. The GI portion may be included in the FFT window at a section of the FFT window that includes a set of zeros. In some examples, the set of zeros for a given symbol may be generated by combining a set of data tones carried by the symbol with a set of redundant tones which may be a linear combination of the set of data tones. Additionally or alternatively, the data tones and the redundant tones may be combined such that the GI portion may be generated rather than a set of zeros.

As such, the data tones and the redundant tones may be combined in frequency domain such that the resulting FFT window includes samples in the GI portion of the OFDM symbol. In some cases, however, including the set of redundant tones for the transmission of data may increase the total power output associated with the data symbol. For examples, the increase in power may be based on samples in the frequency domain that modulate the tones in a symbol, and as such may change from symbol to symbol. This increase in total power may cause a power offset between a first OFDM symbol carrying a reference signal (e.g., a demodulated reference signal (DMRS)) and a second OFDM symbol carrying data associated with the reference signal (e.g., on a same physical channel). In some cases, wireless communications systems may assume a same power output for the transmission of DMRS symbols and data symbols. As such, decoding a reference signal and a data signal assuming a same power may be incorrect, error prone, or both, resulting in poor communication performance (e.g., beam failure, increased retransmissions, poor throughput, etc.).

As such, the network entity and the UE may communicate additional signaling to identify the power offset between different symbol types for channel estimation. For example, the network entity may transmit a control signal (e.g., via downlink control information (DCI), a medium access control-control element (MAC-CE), or a radio resource control signal (RRC)) that indicates a power backoff to use for a data symbol with reference to a defined reference symbol (e.g., a DMRS symbol associated with the data symbol). In some examples, when configured with the control signal, the UE may back off transmit power for a set of data symbols to meet an average transmission power threshold configured by the network or in accordance with a UE capability.

Additionally, or alternatively, if the network entity configures a symbol type (e.g., physical downlink shared channel (PDSCH), position tracking reference signal (PTRS), channel state information reference signal (CSI-RS), etc.) in downlink and the average and/or variance of the associated power backoff for a symbol type surpasses a power backoff threshold, the network may transmit an average power offset for use in accordance with a given symbol type. Additionally or alternatively to the average power offset, the network entity may also signal a variance distribution of the power offset across symbols. In some cases, the network entity may signal a power offset on a per symbol basis. In some cases, the network entity may transmit a signal indicating a threshold allowed power offset for each symbol type, such that the UE may not exceed the allowed power threshold in communications of the associated symbol type.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to signaling a power offset between reference and data tones.

FIG. 1 illustrates an example of a wireless communications system 100 that supports signaling a power offset between reference and data tones in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support signaling a power offset between reference and data tones as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communication system 100 a UE 115 and a network entity 105 may communicate in accordance with UW-OFDM scheme. In such examples, a given TTI may include a set of OFDM symbols, where each OFDM symbol may be associated with an FFT window that includes a GI portion and a data portion. The GI portion may be added in the FFT window at a section of the FFT window that includes a set of zeros. In some examples, the set of zeros for a given symbol may be generated by combining a set of data tones carried by the symbol with a set of redundant tones which may be a linear combination of the set of data tones. As such, the data tones and the redundant tones may be combined in frequency space such that the resulting FFT window includes the set of zeros in the time domain. In some cases, however, including the set of redundant tones for the transmission of data may increase the total power output associated with the data symbol. This increase in total power may cause a power offset between a first OFDM symbol carrying a reference signal (e.g., a DMRS) and a second OFDM symbol carrying data associated with a physical channel.

As such, the network entity 105 and the UE 115 may communicate additional signaling to clarify the power offset between different symbol types for channel estimation. For example, the network entity 105 may transmit a control signal that indicates a power backoff to use for a data symbol with reference to a defined reference symbol. Additionally, or alternatively, if the network entity 105 configures a symbol type in downlink and the distribution of the associated power backoff surpasses a power backoff threshold, the network may transmit an average power offset for use in accordance with a given symbol type. Additionally or alternatively to the average power offset, the network entity 105 may also signal a variance distribution of the power offset across symbols. In some cases, the network entity 105 may signal a power offset on a per symbol basis. In some cases, the network entity 105 may transmit a signal indicating a threshold allowed power offset for each symbol type, such that the UE 115 may not exceed the allowed power threshold in communications of the associated symbol type.

Figure 2:
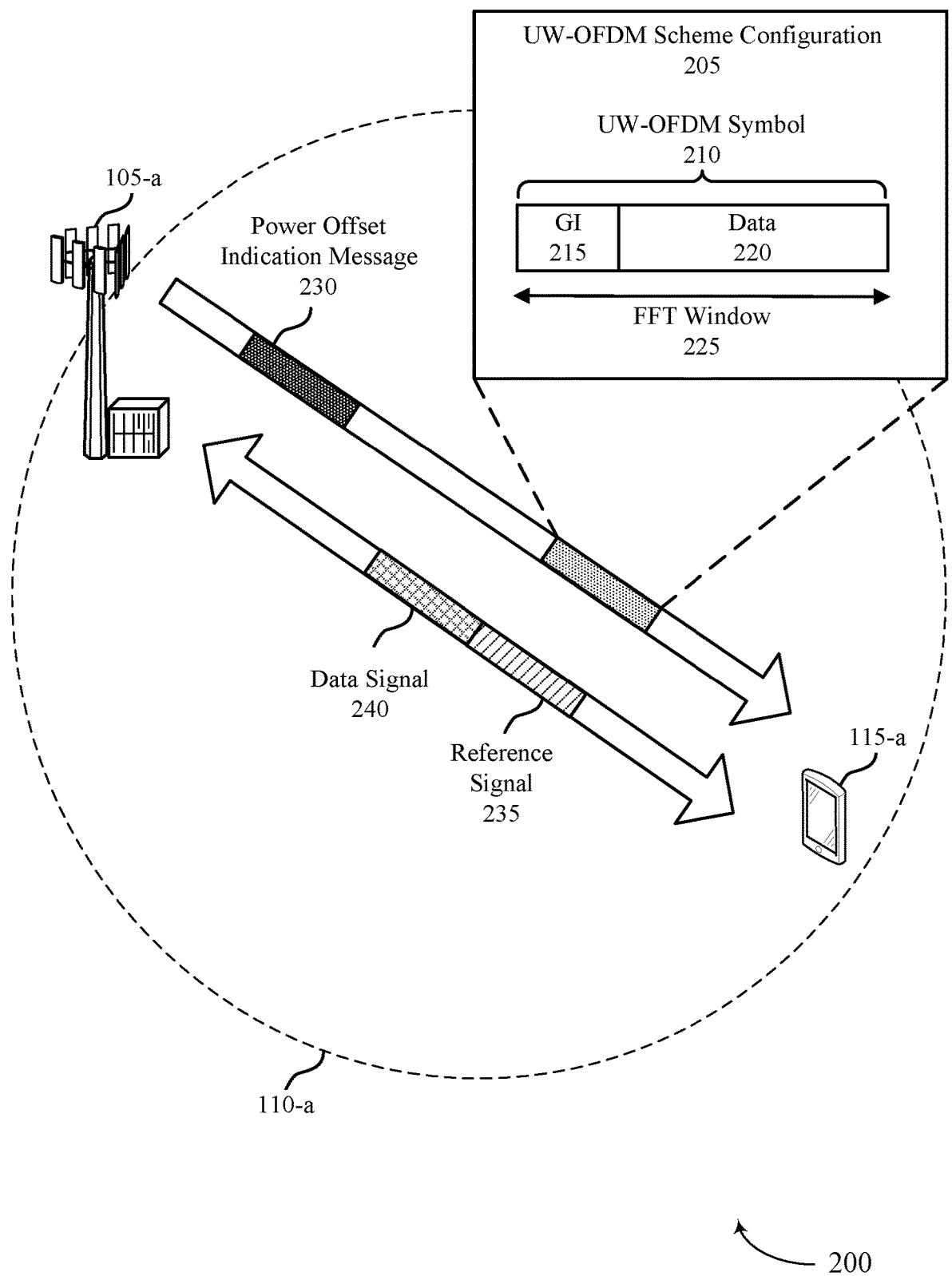
FIG. 2 illustrates an example of a wireless communications system that supports signaling a power offset between reference and data tones in accordance with one or more aspects of the present disclosure.

FIG. 2 illustrates an example of a wireless communications system 200 that supports signaling a power offset between reference and data tones in accordance with one or more aspects of the present disclosure. In some examples, wireless communications system 200 may implement one or more aspects of wireless communications system 100. For instance, a UE 115-*a*, a network entity 105-*a*, and a geographic coverage are 110-*a* may be respective examples of a UE 115, a network entity 105, and a geographic coverage area 110 as described with reference to FIG. 1. While examples are discussed herein, any number of devices and device types may be used to accomplish implementations described in the present disclosure.

In some examples of the wireless communications system 200, the UE 115-*a* and network entity 105-*a* may communicate in accordance with a UW-OFDM scheme. A UW-OFDM may be a GI based waveform that may be used in addition or alternative to a cyclic prefix (CP) based waveform (e.g., CP-OFDM). As such, the network entity 105-*a* may transmit to the UE 115-*a* a UW-OFDM scheme configuration 205, that may establish the use of UW-OFDM symbols 210 for one or more TTIs. As illustrated in FIG. 2, each UW-OFDM symbol 210 may be associated with an FFT window 225 that includes a GI 215 portion and a data 220 portion. In some examples, a GI 215 portion may lie within the FFT window 225, while a CP associated with a CP-OFDM may lie outside of the FFT window 225. The GI 215 portion may be placed at the beginning or at the end of the FFT window 225. In some cases, including the GI 215 portion within the FFT window 225 may allow the flexibility to adapt the GI 215 type and length based on channel and multipath conditions while retaining the associated UW-OFDM symbol 210 length. Additionally, or alternatively, the use of UW-OFDM scheme configuration 205 may enable the network entity 105-a or UE 115-a to generate a UW (e.g., a known sequence) within the GI 215 portion. For instance, a UW may be used as a reference signal or a gap and may serve for frequency or phase tracking, noise or interference estimation, inter-symbol interference (ISI), or a combination thereof.

In some cases, the GI 215 portion may be added in the FFT window 225 at a section of the FFT window 225 that includes a set of zeros (e.g., set $N_u$, where $N_u$ is the length of the UW). For instance, during subcarrier mapping in frequency space, the network entity 105-a or UE 115-a may include a set of redundant tones which may be a linear combination of data tones included in the data 220 portion. As such, the subcarriers carrying the respective data tones and redundant tones may be modulated to generate the associated UW of length $N_u$ in the time domain. Additionally, or alternatively, the subcarriers carrying the respective data tones and redundant tones may be modulated to generate a zero tail (ZT) of length $N_u$ in the time domain. In examples where a ZT is generated, the resulting symbol may be an example of a ZT-OFDM symbol. In such examples, the network entity 105-a or UE 115-a may amend the UW to the ZT of the ZT-OFDM symbol to produce the UW-OFDM symbol 210.

Based on the redundant tones being a function of the data tones, the redundant tones may vary from symbol to symbol. In some cases, including the set of redundant tones for the transmission of the UW-OFDM symbol 210 may increase the total power output of the transmission. This increase in total power may cause a power offset between a first UW-OFDM symbol 210 carrying a reference signal (e.g., a DMRS) and a second UW-OFDM symbol 210 carrying data associated with a physical channel (e.g., a physical downlink shared channel (PDSCH)). Additionally, or alternatively, the power offset between a DMRS tone and a data tone may vary for a given symbol type. For instance, a first PDSCH symbol and a second PDSCH symbol may have a different power offset relative to a same reference symbol. In some cases, however, new radio (NR) techniques may assume a same power output for the transmission of DMRS symbols and data symbols. Under such an assumption, decoding received communications may be incorrect, error prone, or both, resulting in poor communication performance (e.g., increased retransmissions, poor throughput, etc.).

To maintain a consistent transmitted power between symbols, the power in the frequency domain may be reduced on a symbol by symbol basis. This may lead to power offset between a data tone in a data symbol (e.g., PDSCH tone in a PDSCH symbol) and a reference tone in a reference symbol (e.g., a DMRS tone in a DMRS symbol). As such, the network entity 105-a and UE 115-a may utilize additional signaling to clarify a power offset between different symbol types (e.g., a power offset between reference symbols and data symbols) for channel estimation. For example, the network entity 105-a may transmit a power offset indication message 230 (e.g., via DCI, MAC-CE, or RRC) that indicates a power backoff to use for a data symbol with reference to a defined reference symbol (e.g., a DMRS symbol associated with the data symbol). For example, a power offset between two symbols (e.g., a PDSCH symbol and a DMRS symbol) may indicate an offset between the transmit power of corresponding tones (e.g., tones at the same location in frequency) in the two symbols (such as between data tones in a PDSCH symbol and corresponding DMRS tones in the DMRS symbol). The power offset indication message 230 may apply to multiple types of symbols (e.g., PDSCH, physical downlink control channel (PDCCH), physical uplink shared channel (PUSCH), physical uplink control channel (PUCCH), PTRS, CSI-RS, among other examples). In some examples, the UE 115-a may assume by default no power backoff on a data tone relative to a reference tone, and as such if a power offset is not configured, the UE 115-a may absorb any residual power offset during a channel estimation procedure.

Additionally, or alternatively, if the power offset indication message 230 configures a power backoff for uplink communications, the UE 115-a may identify a backoff of power between transmitting a reference signal tone and transmitting a data tone to meet an average transmission power threshold configured by the network. For example, the UE 115-a may transmit reference signal using a first transmit power, and transmit a data signal associated with the reference signal using a second transmit power based on the indicated power offset. In such examples, the first transmit power and second transmit power used may satisfy a maximum transmit power threshold. If a power backoff is not configured for uplink communications, the UE 115-a may refrain from performing a back off between a reference signal tone and a data tone during an uplink transmission, or may perform a power back off based on an associated hardware capability at the UE 115-a.

In some examples, a given symbol type (e.g., PDSCH, PTRS, or CSI-RS in downlink) may have an associated average power offset relative to an associated reference symbol. As such, in cases where a distribution of power backoff changes significantly from symbol to symbol for a given symbol type (e.g., the difference in power offset between a first symbol of a first type and a second symbol of the first type is above a configured threshold), the network entity 105-a may transmit a control message indicating the average power offset of that symbol type. In such examples, the UE 115-a may use the average power offset indicated by the network entity 105-a when receiving the multiple symbols.

Additionally or alternatively to indicating the average power offset for a given symbol type, the network entity 105-a may transmit statistical information associated with power offsets across a set of UW-OFDM symbols 210. In some examples, the statistical information may indicate a variance of distribution of power offset across the set of UW-OFDM symbols 210. The indication of the statistical information may improve channel estimation from symbol to symbol at the UE 115-a.

In some examples, the network entity 105-a or the UE 115-a may signal a power offset for each symbol of a set of UW-OFDM symbols 210 (e.g., with respect to a reference symbol). As such, the signaling may originate from either the network entity 105-a or the UE 115-a via downlink or uplink respectively. In some cases, the network entity 105-a or the UE 115-a may transmit the signaling along with each UW-OFDM symbol 210. For example, the network entity 105-a or the UE 115-a may multiplex the signaling (e.g., in frequency, in time, or both) with the associated UW-OFDM symbol 210. In some cases, the network entity 105-a or the UE 115-a may transmit one signal once per slot that indicates a respective power offset for each UW-OFDM symbol 210 in that slot. Additionally, or alternatively, the network entity 105-*a* or the UE 115-*a* may transmit the signaling via a control channel (e.g., PDCCH or PUCCH) or as one or more reference tones on a shared channel (e.g., as part of a PDSCH symbol).

In some cases, the network entity 105-*a* may signal to the UE 115-*a* a control message indicating a power offset threshold associated with a symbol type with reference to an associated reference symbol. For example, the network entity 105-*a* may indicate a power offset threshold for PDSCH symbols, such that the UE 115-*a* may assume that a power offset of a received PDSCH symbol (e.g., with respect to a reference symbol) may be limited by the indicated power offset threshold. This information may be used by the UE 115-*a* to aid channel estimation and demodulation process when receiving a PDSCH symbol. In some examples, an indicated power offset threshold may be used by the network entity 105-*a* and the UE 115-*a* in both uplink and downlink transmissions. For instance, the network entity 105-*a* or the UE 115-*a* may use the indicated power offset threshold if a power offset on a symbol by symbol basis has not been configured. Using the power offset threshold may limit the error in channel estimation associated with power offsets for the upper and lower limit of a power offset distribution. If a power offset for a given UW-OFDM symbol 210 is above the indicated power offset threshold, the transmitting device (e.g., either the network entity 105-*a* or the UE 115-*a*) may adjust the redundant tones used to generate the UW-OFDM symbol 210 to satisfy the indicated power offset threshold.

Based on the power offset indication message 230, the network entity 105-*a* and the UE 115-*a* may communicate a reference signal 235 and a data signal 240 in accordance with the UW-OFDM scheme configuration 205. As such, the data signal 240 may be communicated at a power offset relative to the reference signal 235 in accordance with the techniques described herein.

In some examples of wireless communications system 200, the network entity 105-*a* may configure the UE 115-*a* with the power offset indication message 230, where the power offset indication message 230 may request one or more indications from the UE 115-*a*. For example, the power offset indication message 230 may request for statistical information on the power offsets of uplink symbols (e.g., average transmission power per symbol or a variance in transmission power per symbol). Additionally or alternatively, the power offset indication message 230 may request symbol by symbol power offset information for a set of uplink symbols at the UE 115-*a*. As such, the UE 115-*a* may transmit to the network entity 105-*a* the one or more indications requested in the power offset indication message 230.

Figure 3:
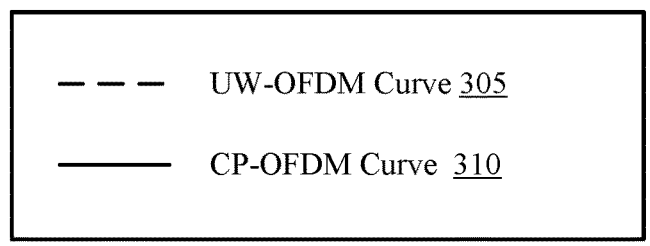
FIG. 3 illustrates an example of a cumulative distribution function (CDF) of transmit power scheme that supports signaling a power offset between reference and data tones in accordance with one or more aspects of the present disclosure.
Figure 3:
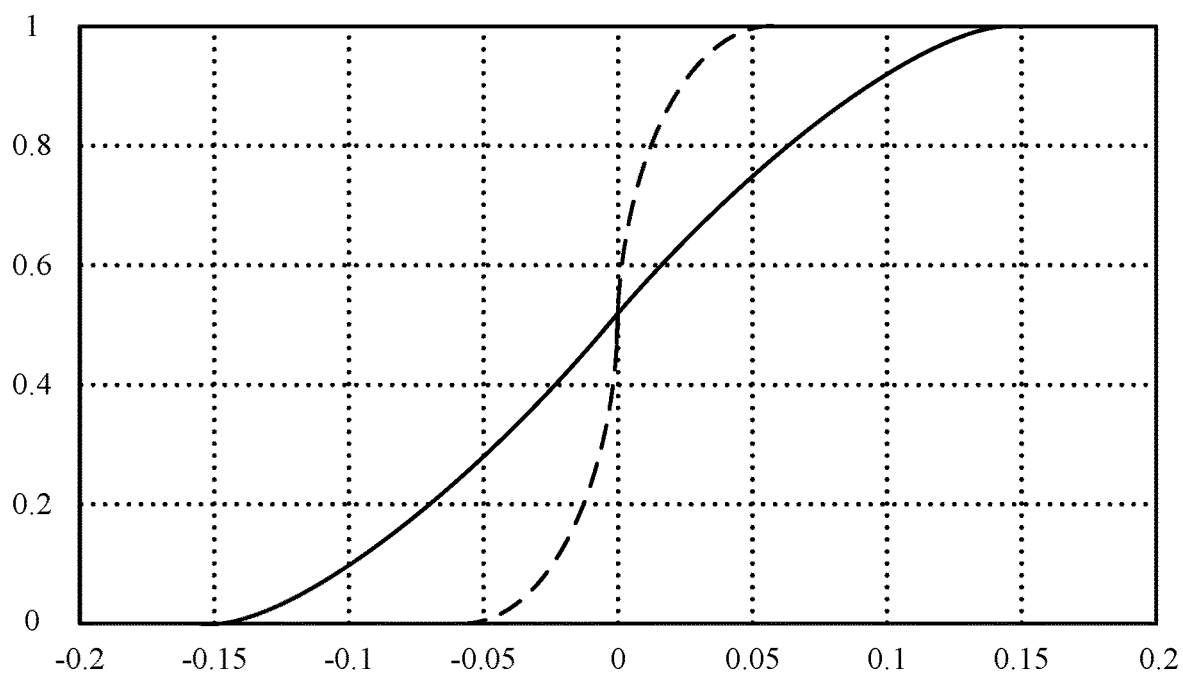
Figure 3:
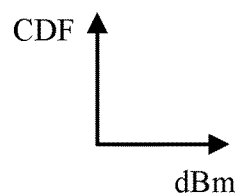

FIG. 3 illustrates an example of a cumulative distribution function (CDF) of transmit power scheme 300 that supports signaling a power offset between reference and data tones in accordance with one or more aspects of the present disclosure. In some examples, CDF of transmit power scheme 300 may implement one or more aspects of wireless communications system 100, wireless communications system 200, or a combination thereof. For instance, a UW-OFDM curve 305 may be an example of a set of transmit powers for a set of UW-OFDM symbols 210 in time domain (e.g., after an indicate power backoff), with reference to FIG. 2. While examples are discussed herein, any number of devices and device types may be used to accomplish implementations described in the present disclosure.

As illustrated in FIG. 3, the CDF of transmit power scheme 300 may include the UW-OFDM curve 305 and a CP-OFDM curve 310. In some examples, the UW-OFDM curve 305 and a CP-OFDM curve 310 may be examples of normalized curves illustrating a distribution of transmit powers for the respective symbol type. For example, the UW-OFDM curve 305 may include a set of UW-OFDM symbols (e.g., associated with a physical channel) where the UW-OFDM curve 305 illustrates a distribution (e.g., a likelihood) of the transmit power for a given symbol type. Additionally or alternatively, the CP-OFDM curve 310 may include a set of CP symbols where the CP-OFDM curve 305 illustrates a distribution (e.g., a likelihood) of the transmit power for a given CP symbol type.

As illustrated in FIG. 3, the UW-OFDM curve 305 and CP-OFDM curve 310 may be centered about a transmit power of 0 dBm (e.g., the average transmit power may be 0 dBm). In some examples, the UW-OFDM curve 305 may have a steeper distribution curve centered about 0 dBm. As such, a transmitting or receiving network device may operate in accordance with the techniques described herein when transmitting one or more UW-OFDM symbols. For example, a wireless device (e.g., a UE 115 or a network entity 105) using UW-OFDM symbols may indicate an offset between the transmit power of corresponding tones (e.g., tones at the same location in frequency) between a reference symbol (e.g., a DMRS symbol) and a data symbol (e.g., a PDSCH symbol). Further discussion of tone based power offsets between two symbols is described herein, including with reference to FIG. 4.

Figure 4:
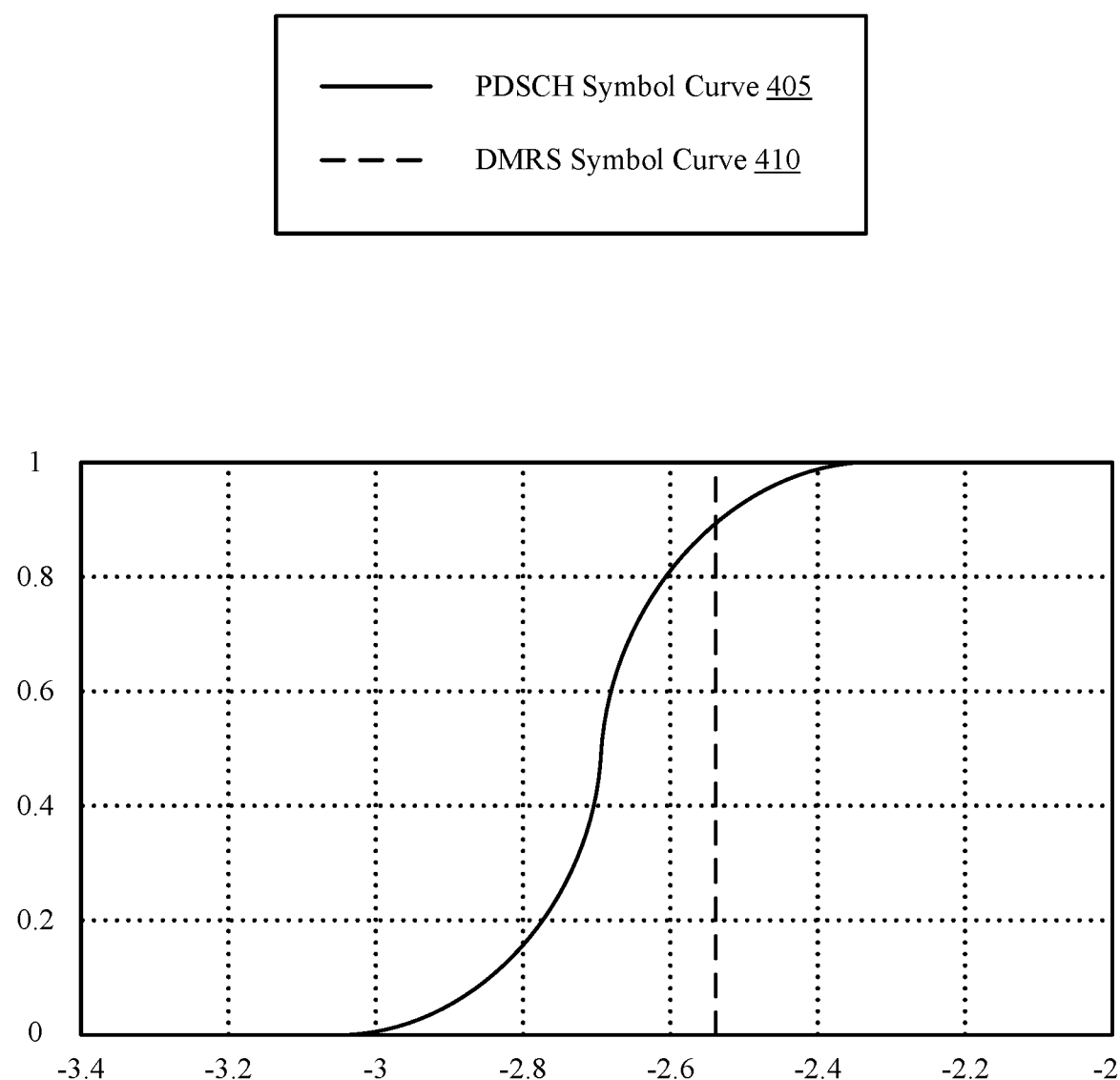
FIG. 4 illustrates an example of a CDF of power backoff scheme that supports signaling a power offset between reference and data tones in accordance with one or more aspects of the present disclosure.
Figure 4:
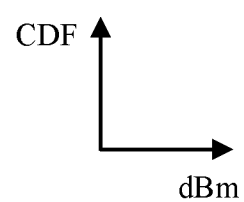

FIG. 4 illustrates an example of a CDF of power backoff scheme 400 that supports signaling a power offset between reference and data tones in accordance with one or more aspects of the present disclosure. In some examples, CDF of power backoff scheme 400 may implement one or more aspects of wireless communications system 100, wireless communications system 200, or a combination thereof. For instance, a PDSCH symbol curve 405 may be an example of a set of offsets in transmit powers for a set of PDSCH symbols (e.g., UW-OFDM symbols 210, with reference to FIG. 2). In some examples, the set of offsets in transmit powers may be used to maintain an average transmit power of each UW-OFDM symbol in the time domain. While examples are discussed herein, any number of devices and device types may be used to accomplish implementations described in the present disclosure.

As described, a power backoff of one or more tones of a UW-OFDM symbol may be used to generate a 0 dBm transmission power output. With reference to FIG. 4, the DMRS symbol curve 410 may include a set of sampled DMRS symbols each including DMRS tones (e.g., a quadrature phase shift keying (QPSK) constellation) where the DMRS tones in the DMRS symbols may have fixed power back off from 0 dBm (e.g., −2.53 dBm with reference to FIG. 4). Additionally or alternatively, the PDSCH symbol curve 405 may include a set of sampled PDSCH symbols (e.g., PDSCH symbols) each including a set of data tones, where the UW-OFDM symbol power back off may vary on a per symbol basis. For example, the PDSCH symbols included in the PDSCH symbol curve 405 may be associated with an average power offset from 0 dBm (e.g., −2.66 dBm) and an associated 99% tile range of power offsets from 0 dBm (e.g., −2.85 to −2.33 dBm). As such, there may be an average power offset and a variable power offset between a DMRS symbol and a given PDSCH symbol.

According to the techniques described in, a transmitting wireless device (e.g., a UE 115 or a network entity 105) may indicate a power offset (such as power offset indication message 230, with reference to FIG. 2). In some examples, the power offset message may indicate an average power offset for the PDSCH symbol type with reference to the DMRS symbol curve 410. Additionally or alternatively, the power offset message may indicate a variable power offset (e.g., a range of power offsets for the PDSCH symbol type with reference to the DMRS curve). As such, the power offset may be used such that the transmission of each UW-OFDM symbol may have a transmission power of 0 dBm.

Figure 5:
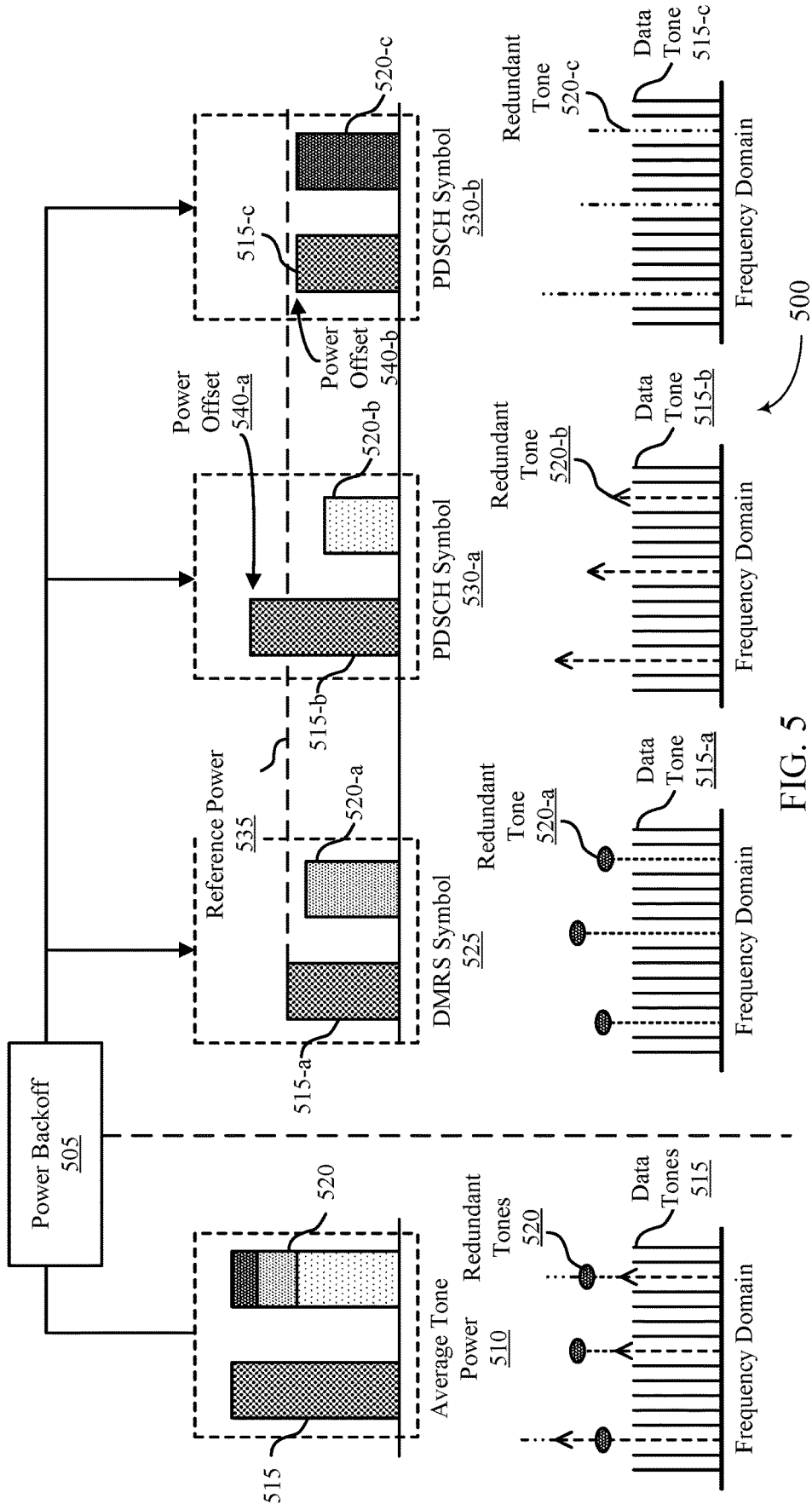
FIG. 5 illustrates an example of a power backoff operation that supports signaling a power offset between reference and data tones in accordance with one or more aspects of the present disclosure.

FIG. 5 illustrates an example of a power backoff operation 500 that supports signaling a power offset between reference and data tones in accordance with one or more aspects of the present disclosure. In some examples, power backoff operation 500 may implement one or more aspects of wireless communications system 100, wireless communications system 200, or a combination thereof. For instance, DMRS symbol 525, PDSCH symbol 530-a, and PDSCH symbol 530-b may be respective examples of UW-OFDM symbols 210, with reference to FIG. 2. While examples are discussed herein, any number of devices and device types may be used to accomplish implementations described in the present disclosure.

In some examples, a wireless device (e.g., a network entity 105 or a UE 115) may transmit one or more UW-OFDM symbols that have an associated average tone power 510 average transmission power for a given tone in the set of UW-OFDM symbols. As such, the wireless device may perform power backoff 505 on the set of symbols UW-OFDM symbols (e.g., DMRS symbol 525, PDSCH symbol 530-a, and PDSCH symbol 530-b) such that each UW-OFDM symbol may have a same transmission power. For instance each UW-OFDM symbols may include a set of data tones 515 and a set of redundant tones 520 where the redundant tones 520 may be a function of the data tones 515. With reference to FIG. 5, the DMRS symbol 525 may include data tones 515-a and redundant tones 520-a, the PDSCH symbol 530-a may include data tones 515-b and redundant tones 520-b, and the PDSCH symbol 530-b may include data tones 515-c and redundant tones 520-c.

As described with reference to FIG. 4, each DMRS symbol 525 may have a same power offset relative to 0 dBm while the PDSCH symbols 530-a and 530-b may have a varying power offset per symbol based on their respective data tones 515 and redundant tones 520. As such, the wireless device may determine a power offset 540 for each PDSCH symbol 530 relative to the DMRS symbol 525. For example, the DMRS symbol 525 may have a reference power 535 associated with the data tones 515-a, which may be consistent between multiple DMRS symbols 525. As such, the data tones 515-b for PDSCH symbol 530-a may have a power offset 540-a relative to the reference power 535. Additionally or alternatively, the data tones 515-c for PDSCH symbol 530-b may have a power offset 540-b related to the reference power 535. In some examples, each power offset 540 may indicate an offset between the transmit power of corresponding tones between the DMRS symbol 525 and a given PDSCH symbol 530 (e.g., tones at the same location in the frequency domain).

As such, the wireless device may transmit a power offset message that indicates a power backoff to use for PDSCH symbol 530-a and PDSCH symbol 530-b with reference to the DMRS symbol 525. In some cases, the power offset message may be an example of power offset indication message 230, with reference to FIG. 2.

Figure 6:
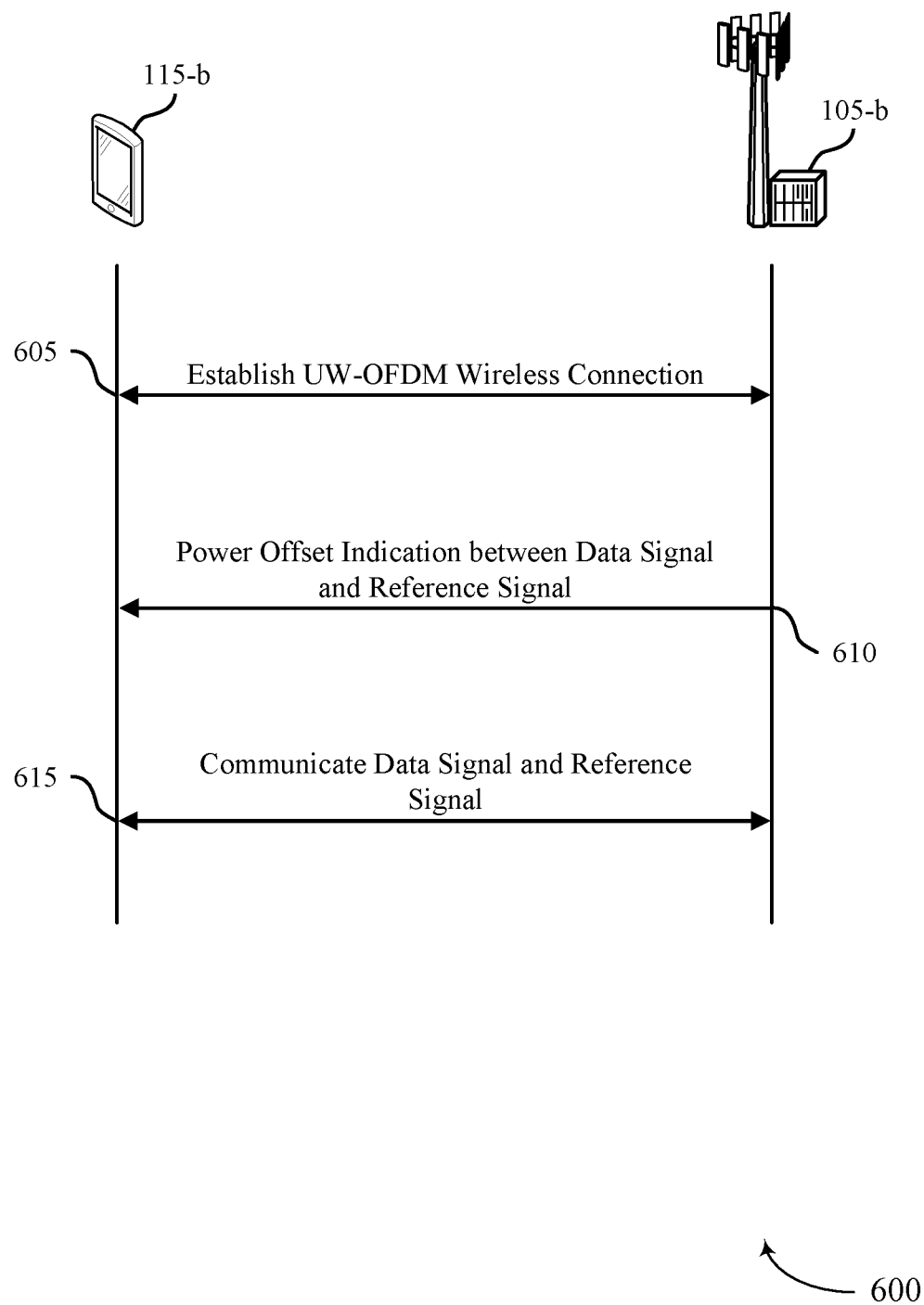
FIG. 6 illustrates an example of a process flow that supports signaling a power offset between reference and data tones in accordance with one or more aspects of the present disclosure.

FIG. 6 illustrates an example of a process flow 600 that supports signaling a power offset between reference and data tones in accordance with one or more aspects of the present disclosure. In some examples, process flow 600 may implement aspects of wireless communications system 100, wireless communications system 200, CDF of transmit power scheme 300, CDF of power backoff scheme 400, power backoff operation 500, or a combination thereof. Process flow 600 includes a UE 115-b and a network entity 105-b which may be respective examples of a UE 115 and a network entity 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 600 shows processes between a single UE 115 and a single network entity 105, it should be understood that these processes may occur between any number of network devices and network device types.

At 605, the UE 115-b may establish with the network entity 105-b, a wireless connection that uses a UW-OFDM scheme configuration. For example, the UW-OFDM scheme configuration may indicate a set of symbols per TTI for OFDM communications, where each symbol of the set of symbols corresponds to an FFT window and includes a GI portion and a data portion within the FFT window.

At 610, the UE 115-b may receive a power offset indication for use in accordance with the UW-OFDM scheme. For example, the UE 115-b may receive a control message indicating at least one parameter associated with a power offset between a data signal of the set of symbols and a reference signal of the set of symbols that is associated with the data signal.

At 615, the UE 115-b may communicate with the network entity 105-b, the data signal, and the reference signal according to the indicated power offset using the set of symbols.

Figure 7:
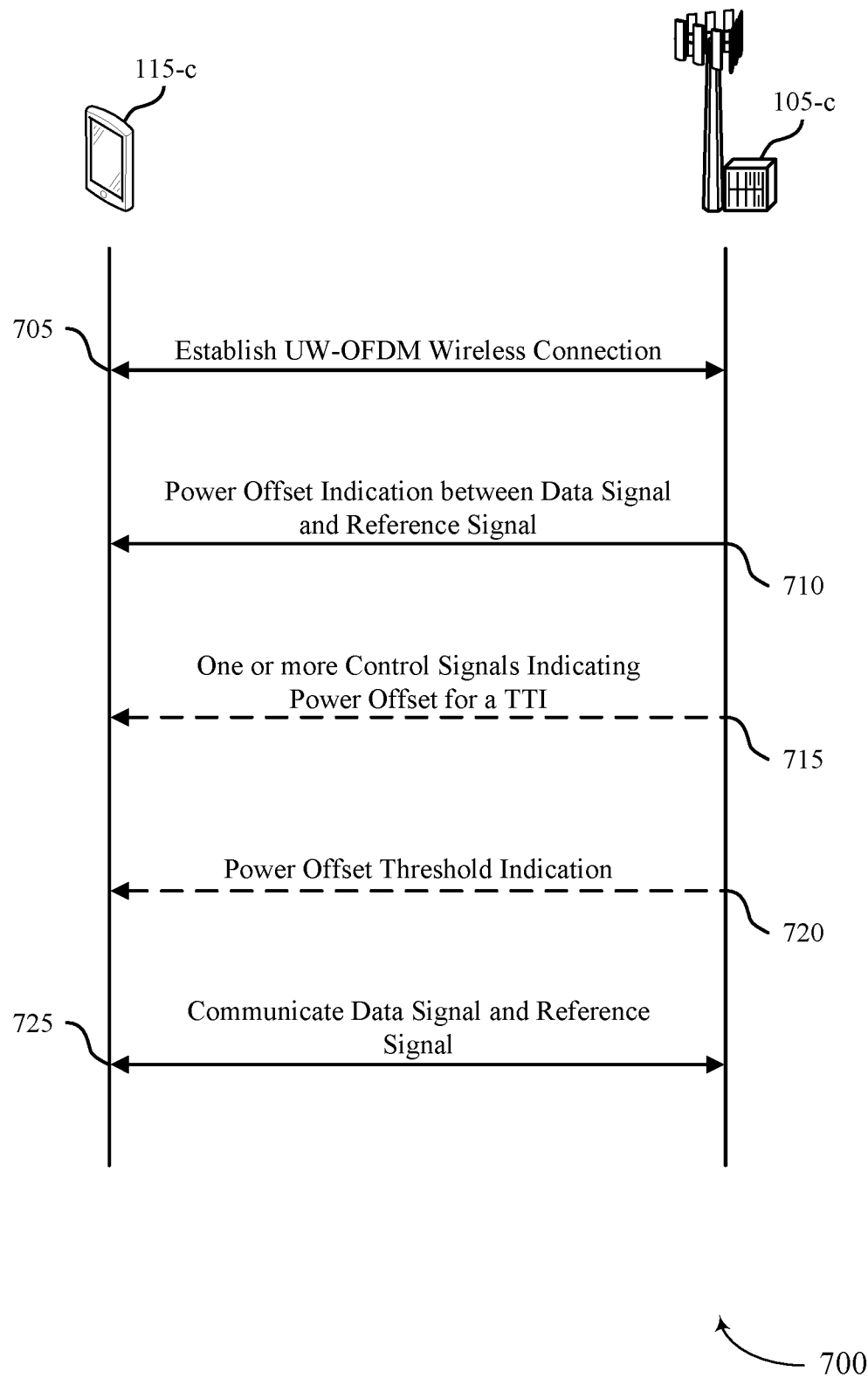
FIG. 7 illustrates an example of a process flow that supports signaling a power offset between reference and data tones in accordance with one or more aspects of the present disclosure.

FIG. 7 illustrates an example of a process flow 700 that supports signaling a power offset between reference and data tones in accordance with one or more aspects of the present disclosure. In some examples, process flow 700 may implement aspects of wireless communications system 100, wireless communications system 200, CDF of transmit power scheme 300, CDF of power backoff scheme 400, power backoff operation 500, or a combination thereof. Process flow 700 includes a UE 115-c and a network entity 105-c which may be respective examples of a UE 115 and a network entity 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 700 shows processes between a single UE 115 and a single network entity 105, it should be understood that these processes may occur between any number of network devices and network device types.

At 705, the UE 115-c may establish with the network entity 105-c, a wireless connection that uses a UW-OFDM scheme configuration. For example, the UW-OFDM scheme configuration may indicate a set of symbols per TTI for OFDM communications, where each symbol of the set of symbols corresponds to an FFT window and includes a GI portion and a data portion within the FFT window.

At 710, the UE 115-c may receive a power offset indication for use in accordance with the UW-OFDM scheme. For example, the UE 115-c may receive a control message indicating at least one parameter associated with a power offset between a data signal of the set of symbols and a reference signal of the set of symbols that is associated with the data signal. In some examples, the data signal may include data tones in data symbols within the set of symbols and the reference signal may include reference tones in reference symbols within the set of symbols, the reference symbols associated with the data symbols. In some examples, the control message may include an indication of whether the UE 115-*c* is to use the power offset between the data signal and the reference signal associated with the data signal. In some examples, the control message may be a DCI, a MAC-CE, an RRC, or a combination thereof.

In some examples, techniques associated with a power offset may be applicable for both uplink and downlink communications. For example, if the power offset indication is associated with a downlink channel (e.g., a PDSCH or PDCCH), then the UE 115-*c* may use the power offset indication for symbol reception in downlink. Additionally or alternatively, if the power offset indication is associated with an uplink channel (e.g., a PUSCH or PUCCH) then the UE 115-*c* may use the power offset indication for symbol transmission in uplink. In some examples, the power offset indication may also apply to multiple channels or symbol types. As such the power offset indication may be used for both UE 115-*c* transmission and reception behavior.

In some examples, the UE 115-*c* may receive a second control message indicating at least one parameter associated with a second power offset associated with a symbol type that includes the data signal, the second power offset between the data signal of the symbol type and the reference signal that is associated with the data signal. As such, the UE 115-*c* may receive from the network entity 105-*c*, the data signal, and the reference signal according to the second indicated power offset.

In some examples, the UE 115-*c* may receive a second control message indicating an average power offset and statistical information associated with power offsets across the set of symbols within a fixed duration for the wireless connection. As such, the UE 115-*c* may receive the data signal and the reference signal based on the average power offset and the statistical information.

In some examples, the UE 115-*c* may receive a set of control messages indicating a respective set of power offsets, each power offset associated with a different symbol type of a set of symbol types. In such examples, the data signal may be a first symbol type of the set of symbol types and the power offset may be a first power offset of the set of power offsets that may be associated with the first symbol type. Additionally, or alternatively, the reference signal may be a DMRS, and the set of symbol types may include one or more of signals of a PDSCH, signals of a PDCCH, signals of a PUSCH, signals of a PUCCH, positioning reference signals (PRSs), or CSI-RSs.

At 715, the UE 115-*c* may receive for the TTI, one or more control signals indicating a power offset for the data signal of the symbols of the set of symbols relative to an associated reference signal.

In some examples, the UE 115-*c* may receive, for each symbol of the set of symbols, a control signal of the one or more control signals indicating an associated power offset for the symbol. In such examples, each control signal may include a reference signal multiplexed in frequency or time with the data signal on a shared channel. Additionally, or alternatively, each control signal may be multiplexed in frequency or time with the data signal on a shared channel.

In some examples, the UE 115-*c* may receive one control signal indicating a power offset applicable for the set of symbols of the TTI.

At 720, the UE 115-*c* may receive a second control message indicating a power offset threshold associated with a symbol type that includes the data signal. In such examples, the data signal and the reference signal mat communicated according to the power offset using the set of symbols based on the power offset satisfying the power offset threshold.

At 725, the UE 115-*c* may communicate with the network entity 105-*c*, the data signal, and the reference signal according to the indicated power offset using the set of symbols. For example, the UE 115-*c* may transmit the reference signal using a first transmit power backoff and transmit the data signal using a second transmit power backoff that may based on the indicated power offset, where the first transmit power and the second transmit power may satisfy a maximum transmit power threshold. By using the first transmit power back off and the second transmit power back off for the respective reference signal and data signal, the network entity 105-*c* and the UE 115-*c* may communicate the reference signal and data signal using a same transmit power.

Figure 8:
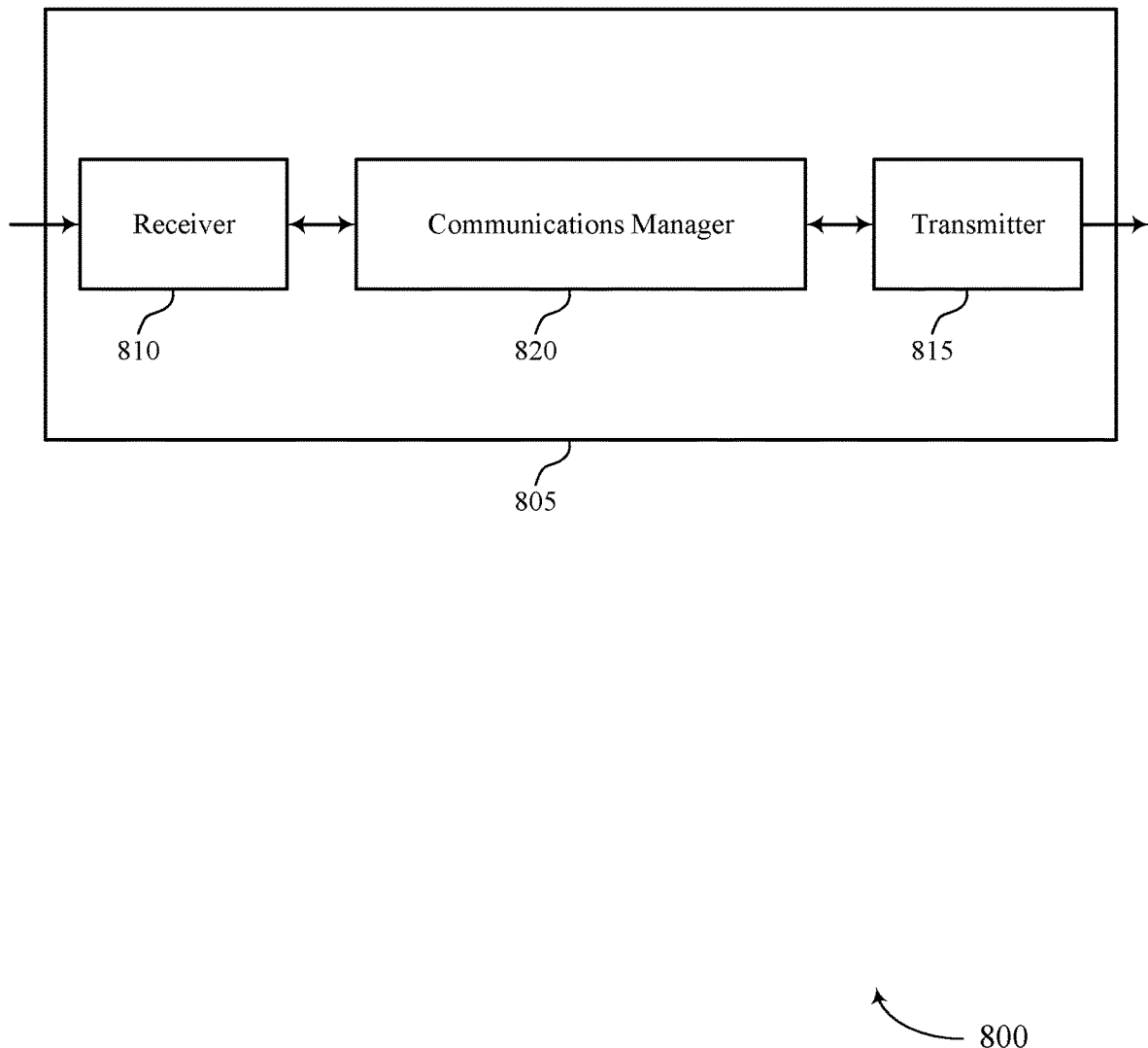
FIGS. 8 and 9 show block diagrams of devices that support signaling a power offset between reference and data tones in accordance with one or more aspects of the present disclosure.

FIG. 8 shows a block diagram 800 of a device 805 that supports signaling a power offset between reference and data tones in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to signaling a power offset between reference and data tones). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to signaling a power offset between reference and data tones). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of signaling a power offset between reference and data tones as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for establishing, with a network entity, a wireless connection that uses a set of symbols per TTI for OFDM communications, where each symbol of the set of symbols corresponds to an FFT window and includes a guard interval portion and a data portion within the FFT window. The communications manager 820 may be configured as or otherwise support a means for receiving a control message indicating at least one parameter associated with a power offset between a data signal of the set of symbols and a reference signal of the set of symbols that is associated with the data signal. The communications manager 820 may be configured as or otherwise support a means for communicating, with the network entity, the data signal, and the reference signal according to the indicated power offset using the set of symbols.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for power offset signaling between reference tones and data tones which may reduce processing, reduce power consumption, increase channel estimation quality, and result in a more efficient utilization of communication resources.

Figure 9:
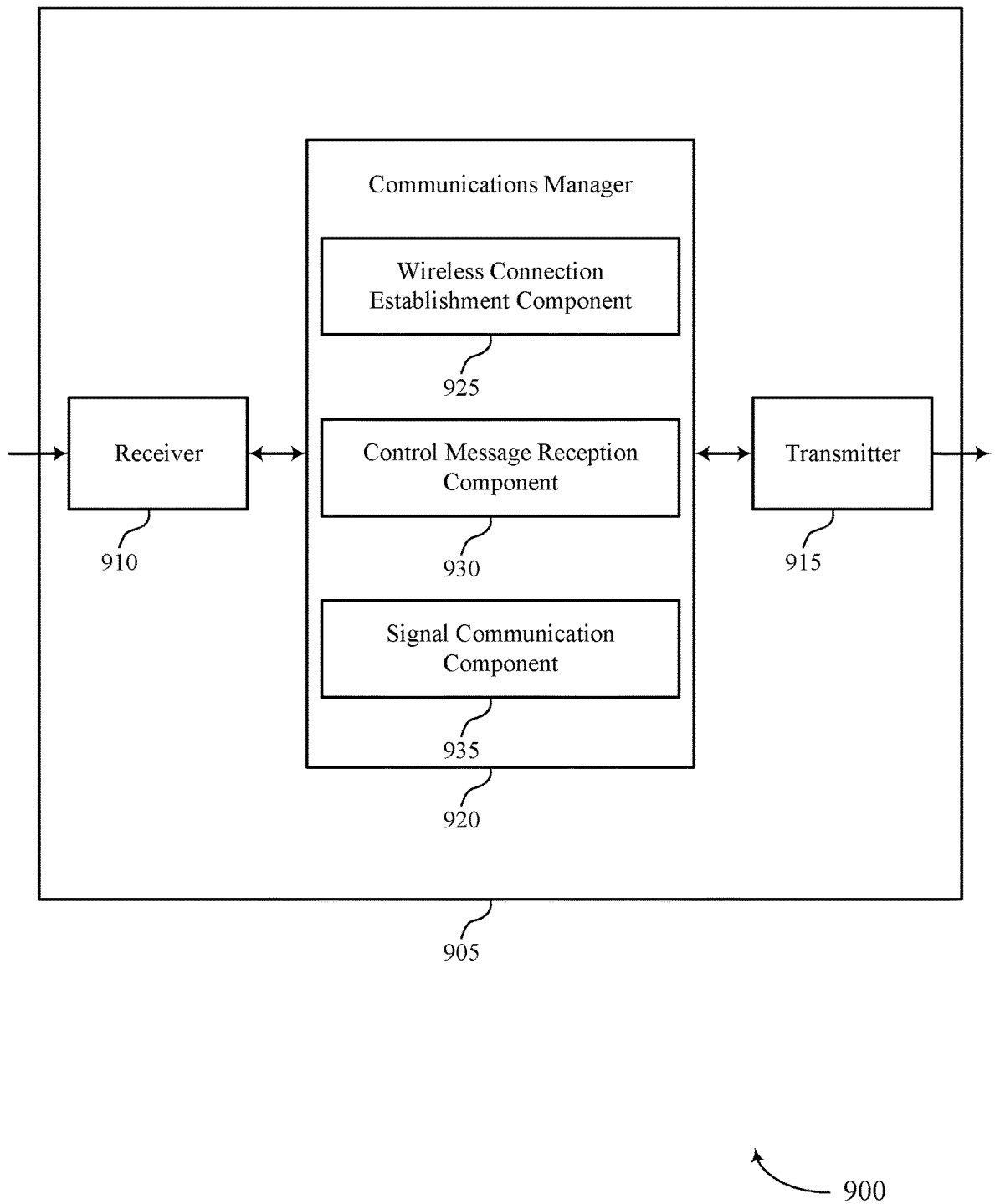

FIG. 9 shows a block diagram 900 of a device 905 that supports signaling a power offset between reference and data tones in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to signaling a power offset between reference and data tones). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to signaling a power offset between reference and data tones). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of signaling a power offset between reference and data tones as described herein. For example, the communications manager 920 may include a wireless connection establishment component 925, a control message reception component 930, a signal communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The wireless connection establishment component 925 may be configured as or otherwise support a means for establishing, with a network entity, a wireless connection that uses a set of symbols per TTI for OFDM communications, where each symbol of the set of symbols corresponds to an FFT window and includes a guard interval portion and a data portion within the FFT window. The control message reception component 930 may be configured as or otherwise support a means for receiving a control message indicating at least one parameter associated with a power offset between a data signal of the set of symbols and a reference signal of the set of symbols that is associated with the data signal. The signal communication component 935 may be configured as or otherwise support a means for communicating, with the network entity, the data signal, and the reference signal according to the indicated power offset using the set of symbols.

Figure 10:
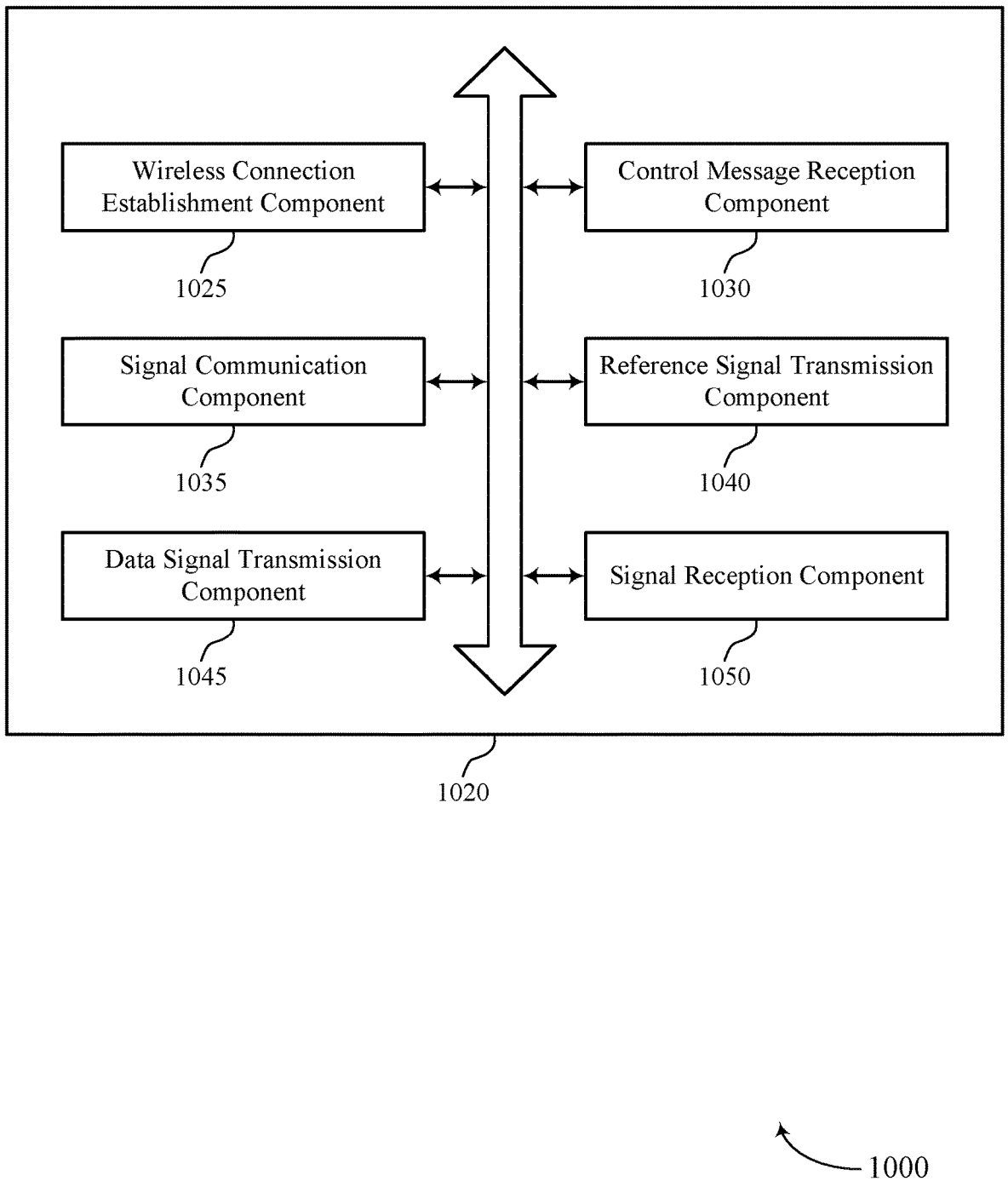
FIG. 10 shows a block diagram of a communications manager that supports signaling a power offset between reference and data tones in accordance with one or more aspects of the present disclosure.

FIG. 10 shows a block diagram 1000 of a communications manager 1020 that supports signaling a power offset between reference and data tones in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of signaling a power offset between reference and data tones as described herein. For example, the communications manager 1020 may include a wireless connection establishment component 1025, a control message reception component 1030, a signal communication component 1035, a reference signal transmission component 1040, a data signal transmission component 1045, a signal reception component 1050, or any combination thereof. Each of these components may communicate, directly or indirectly, with one another (e.g., via one or more buses).

The communications manager 1020 may support wireless communications at a UE in accordance with examples as disclosed herein. The wireless connection establishment component 1025 may be configured as or otherwise support a means for establishing, with a network entity, a wireless connection that uses a set of symbols per TTI for OFDM communications, where each symbol of the set of symbols corresponds to an FFT window and includes a guard interval portion and a data portion within the FFT window. The control message reception component 1030 may be configured as or otherwise support a means for receiving a control message indicating at least one parameter associated with a power offset between a data signal of the set of symbols and a reference signal of the set of symbols that is associated with the data signal. The signal communication component 1035 may be configured as or otherwise support a means for communicating, with the network entity, the data signal, and the reference signal according to the indicated power offset using the set of symbols.

In some examples, to support communicating the data signal and the reference signal, the reference signal transmission component 1040 may be configured as or otherwise support a means for transmitting the reference signal using a first transmit power. In some examples, to support communicating the data signal and the reference signal, the data signal transmission component 1045 may be configured as or otherwise support a means for transmitting the data signal using a second transmit power that is based on the indicated power offset, where the first transmit power and the second transmit power satisfy a maximum transmit power threshold.

In some examples, the power offset includes a first power offset, and the control message reception component 1030 may be configured as or otherwise support a means for receiving a second control message indicating at least one parameter associated with a second power offset associated with a symbol type that includes the data signal, the second power offset between the data signal of the symbol type and the reference signal that is associated with the data signal. In some examples, the power offset includes a first power offset, and the signal reception component 1050 may be configured as or otherwise support a means for receiving, from the network entity, the data signal, and the reference signal according to the second indicated power offset.

In some examples, the at least one parameter associated with the power offset includes a first power offset, and the control message reception component 1030 may be configured as or otherwise support a means for receiving a second control message indicating an average power offset and statistical information associated with power offsets across the set of symbols within a fixed duration for the wireless connection. In some examples, the at least one parameter associated with the power offset includes a first power offset, and the signal reception component 1050 may be configured as or otherwise support a means for receiving the data signal and the reference signal based on the average power offset and the statistical information.

In some examples, the control message reception component 1030 may be configured as or otherwise support a means for receiving, for the TTI, one or more control signals indicating a power offset for the data signal of the set of symbols relative to an associated reference signal.

In some examples, to support receiving the one or more control signals, the control message reception component 1030 may be configured as or otherwise support a means for receiving, for each symbol of the set of symbols, a control signal of the one or more control signals indicating an associated power offset for the symbol.

In some examples, the control signal includes a reference signal multiplexed in frequency or time with the data signal on a shared channel.

In some examples, the control signal is multiplexed in frequency or time with the data signal on a shared channel.

In some examples, to support receiving the one or more control signals, the control message reception component 1030 may be configured as or otherwise support a means for receiving one control signal indicating a power offset applicable for the set of symbols of the TTI.

In some examples, the control message reception component 1030 may be configured as or otherwise support a means for receiving a second control message indicating a power offset threshold associated with a symbol type that includes the data signal, where the data signal and the reference signal are communicated according to the power offset using the set of symbols based on the power offset satisfying the power offset threshold.

In some examples, the control message reception component 1030 may be configured as or otherwise support a means for receiving a set of control messages indicating a respective set of power offsets, each power offset associated with a different symbol type of a set of symbol types, where the data signal is a first symbol type of the set of symbol types and the power offset is a first power offset of the set of power offsets that is associated with the first symbol type.

In some examples, the reference signal includes a DMRS, and the set of symbol types include one or more of signals of a PDSCH, signals of PDCCH, signals of a PUSCH, signals of a PUCCH, PRSs, or CSI-RSs.

In some examples, to support receiving the control message indicating the at least one parameter associated with the power offset, the control message reception component 1030 may be configured as or otherwise support a means for receiving an indication of whether the UE is to use the power offset between the data signal and the reference signal associated with the data signal.

In some examples, to support receiving the control message, the control message reception component 1030 may be configured as or otherwise support a means for receiving DCI, a MAC-CE, a RRC signal, or a combination thereof.

In some examples, the data signal includes data tones in data symbols within the set of symbols and the reference signal includes reference tones in reference symbols within the set of symbols, the reference symbols associated with the data symbols.

Figure 11:
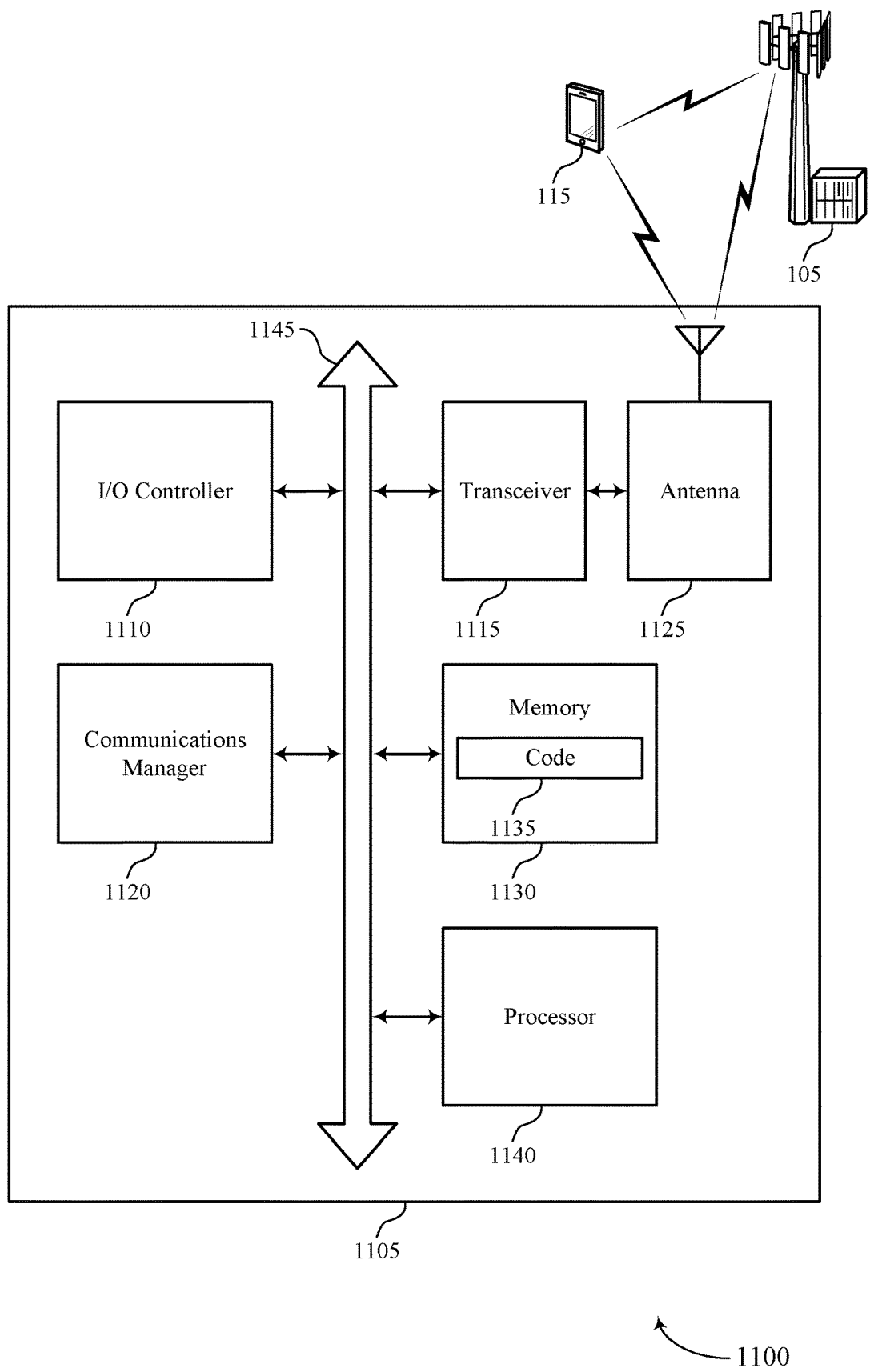
FIG. 11 shows a diagram of a system including a device that supports signaling a power offset between reference and data tones in accordance with one or more aspects of the present disclosure.

FIG. 11 shows a diagram of a system 1100 including a device 1105 that supports signaling a power offset between reference and data tones in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting signaling a power offset between reference and data tones). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for establishing, with a network entity, a wireless connection that uses a set of symbols per TTI for OFDM communications, where each symbol of the set of symbols corresponds to an FFT window and includes a guard interval portion and a data portion within the FFT window. The communications manager 1120 may be configured as or otherwise support a means for receiving a control message indicating at least one parameter associated with a power offset between a data signal of the set of symbols and a reference signal of the set of symbols that is associated with the data signal. The communications manager 1120 may be configured as or otherwise support a means for communicating, with the network entity, the data signal, and the reference signal according to the indicated power offset using the set of symbols.

By including or configuring the communications manager 1120 in accordance with examples as described herein, the device 1105 may support techniques for power offset signaling between reference tones and data tones which may reduce processing, reduce power consumption, increase channel estimation quality, improve user experience related to reduced processing, improve coordination between devices, and result in a more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of signaling a power offset between reference and data tones as described herein, or the processor 1140 and the memory 1130 may be otherwise configured to perform or support such operations.

Figure 12:
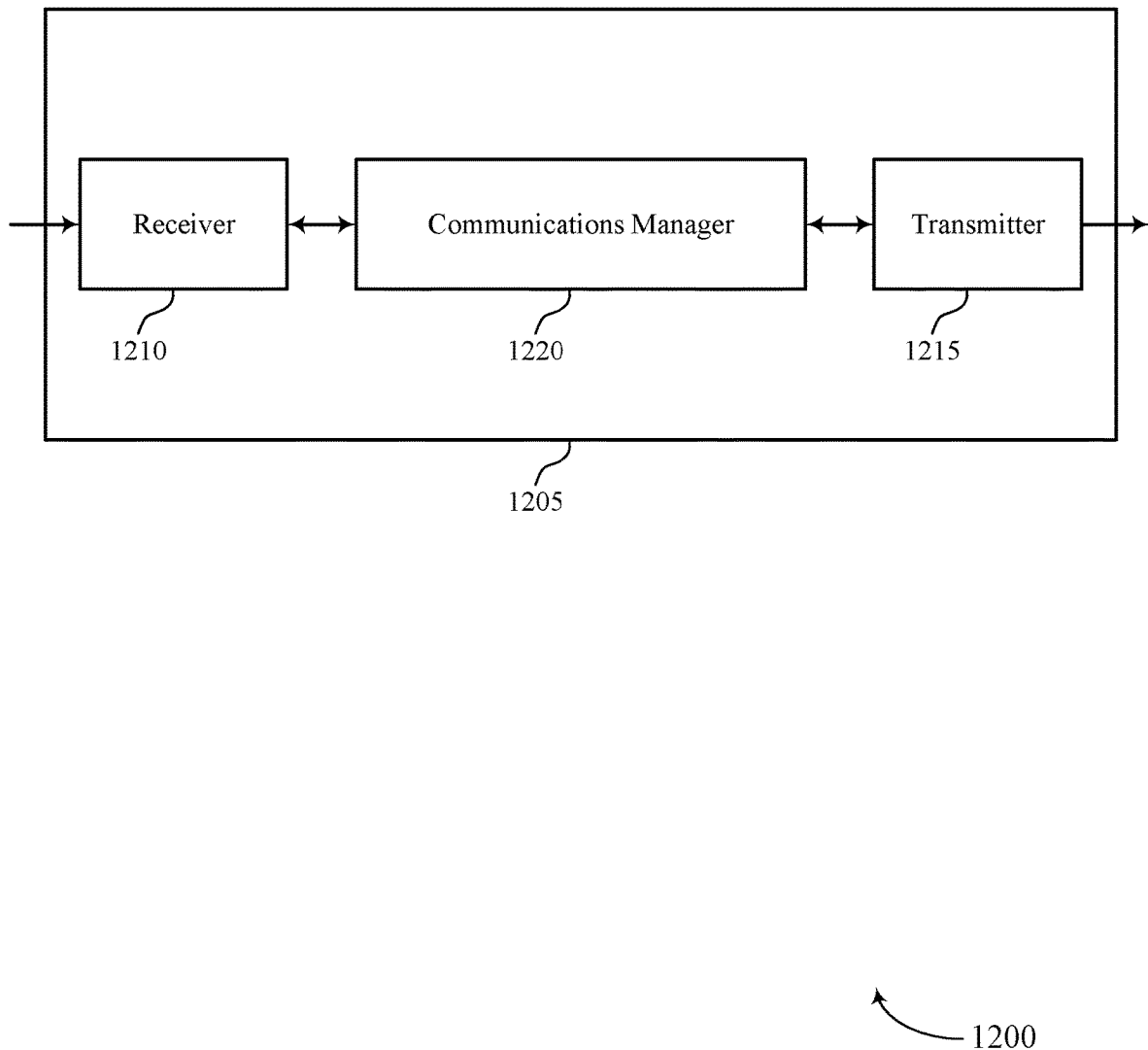
FIGS. 12 and 13 show block diagrams of devices that support signaling a power offset between reference and data tones in accordance with one or more aspects of the present disclosure.

FIG. 12 shows a block diagram 1200 of a device 1205 that supports signaling a power offset between reference and data tones in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of signaling a power offset between reference and data tones as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for establishing, with a UE, a wireless connection that uses a set of symbols per TTI for OFDM communications, where each symbol of the set of symbols corresponds to an FFT window and includes a guard interval portion and a data portion within the FFT window. The communications manager 1220 may be configured as or otherwise support a means for transmitting a control message indicating at least one parameter associated with a power offset between a data signal of the set of symbols and a reference signal of the set of symbols that is associated with the data signal. The communications manager 1220 may be configured as or otherwise support a means for communicating, with the UE, the data signal, and the reference signal according to the indicated power offset using the set of symbols.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for power offset signaling between reference tones and data tones which may reduce processing, reduce power consumption, increase channel estimation quality, and result in a more efficient utilization of communication resources.

Figure 13:
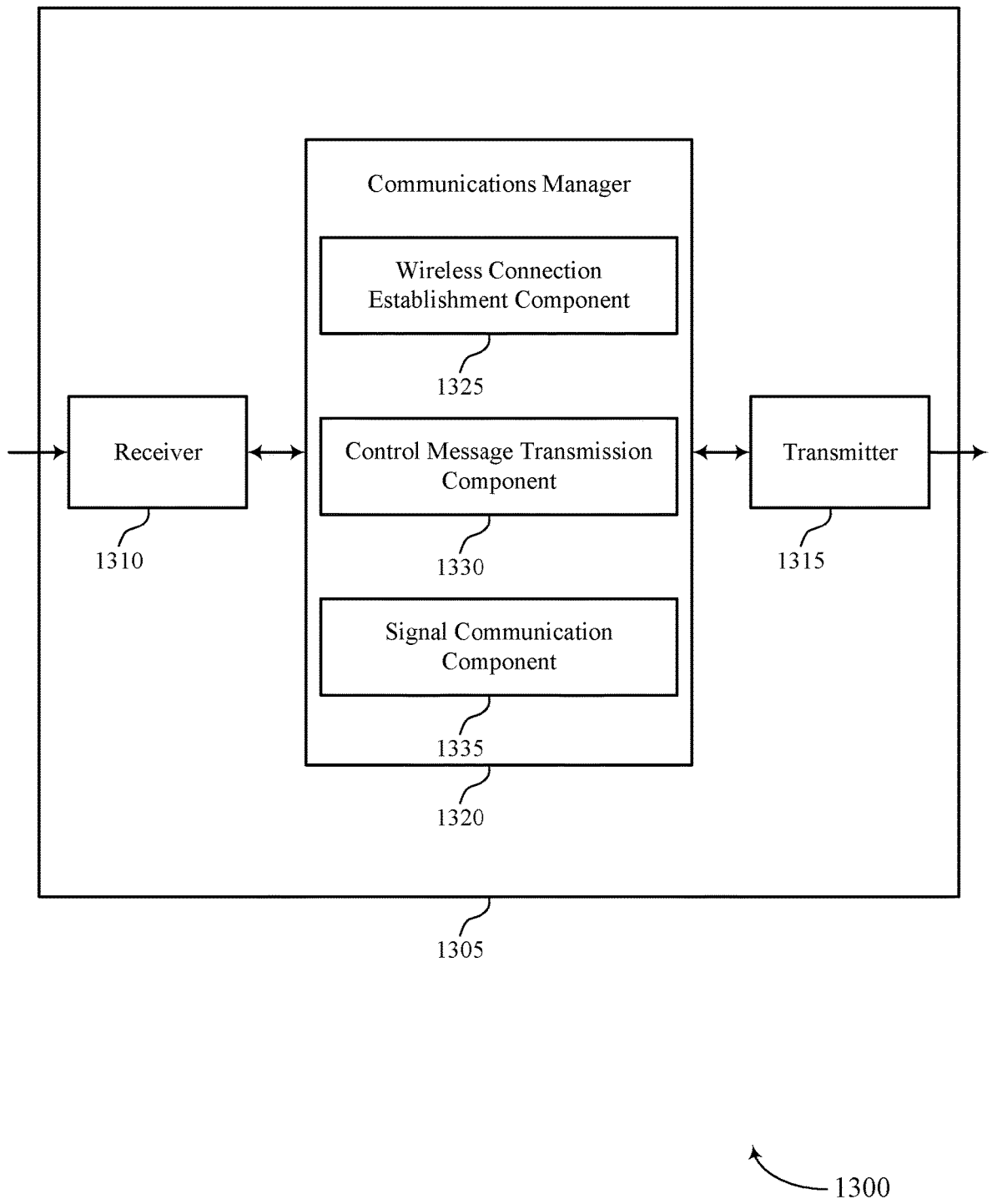

FIG. 13 shows a block diagram 1300 of a device 1305 that supports signaling a power offset between reference and data tones in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of signaling a power offset between reference and data tones as described herein. For example, the communications manager 1320 may include a wireless connection establishment component 1325, a control message transmission component 1330, a signal communication component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The wireless connection establishment component 1325 may be configured as or otherwise support a means for establishing, with a UE, a wireless connection that uses a set of symbols per TTI for OFDM communications, where each symbol of the set of symbols corresponds to an FFT window and includes a guard interval portion and a data portion within the FFT window. The control message transmission component 1330 may be configured as or otherwise support a means for transmitting a control message indicating at least one parameter associated with a power offset between a data signal of the set of symbols and a reference signal of the set of symbols that is associated with the data signal. The signal communication component 1335 may be configured as or otherwise support a means for communicating, with the UE, the data signal, and the reference signal according to the indicated power offset using the set of symbols.

Figure 14:
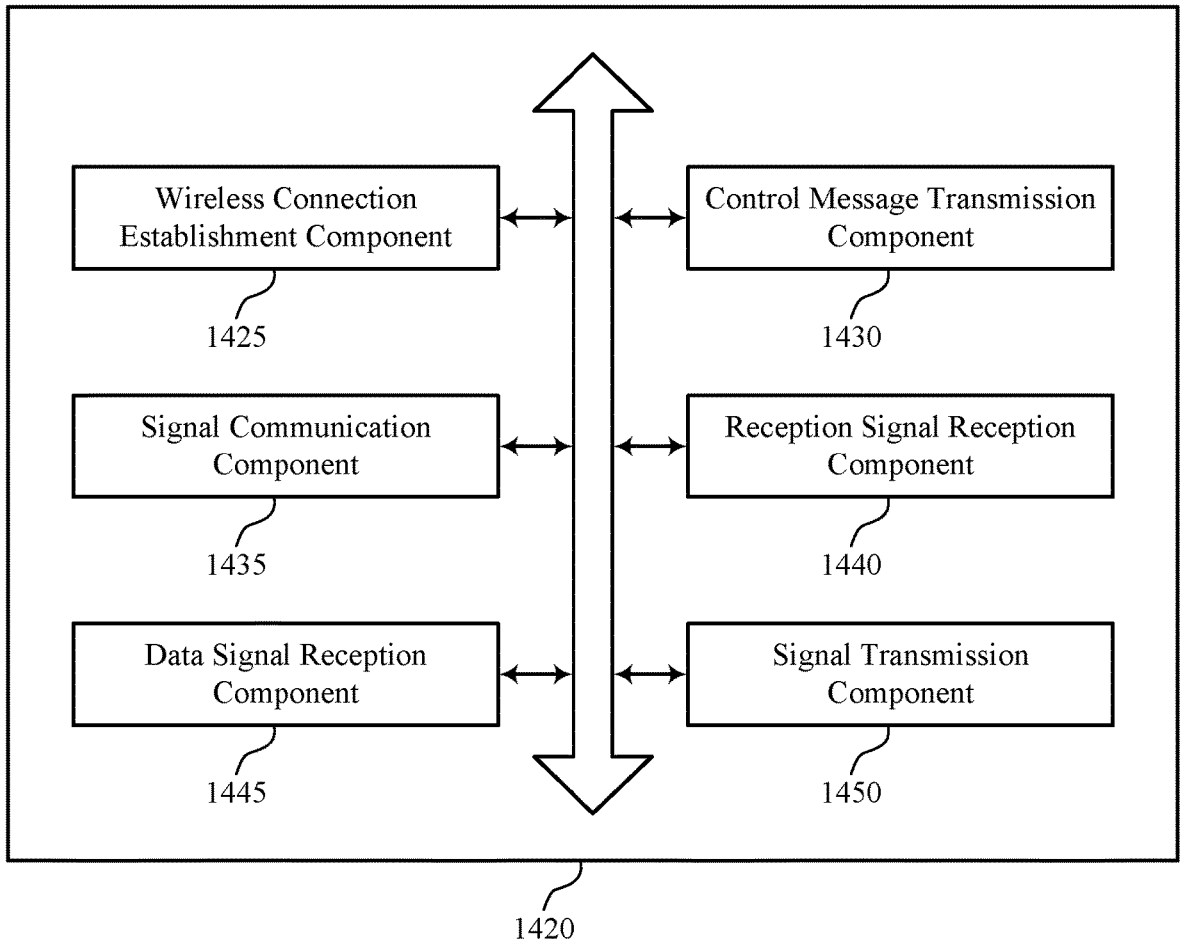
FIG. 14 shows a block diagram of a communications manager that supports signaling a power offset between reference and data tones in accordance with one or more aspects of the present disclosure.

FIG. 14 shows a block diagram 1400 of a communications manager 1420 that supports signaling a power offset between reference and data tones in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of signaling a power offset between reference and data tones as described herein. For example, the communications manager 1420 may include a wireless connection establishment component 1425, a control message transmission component 1430, a signal communication component 1435, a reception signal reception component 1440, a data signal reception component 1445, a signal transmission component 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The wireless connection establishment component 1425 may be configured as or otherwise support a means for establishing, with a UE, a wireless connection that uses a set of symbols per TTI for OFDM communications, where each symbol of the set of symbols corresponds to an FFT window and includes a guard interval portion and a data portion within the FFT window. The control message transmission component 1430 may be configured as or otherwise support a means for transmitting a control message indicating at least one parameter associated with a power offset between a data signal of the set of symbols and a reference signal of the set of symbols that is associated with the data signal. The signal communication component 1435 may be configured as or otherwise support a means for communicating, with the UE, the data signal, and the reference signal according to the indicated power offset using the set of symbols.

In some examples, to support communicating the data signal and the reference signal, the reception signal reception component 1440 may be configured as or otherwise support a means for receiving the reference signal using a first transmit power. In some examples, to support communicating the data signal and the reference signal, the data signal reception component 1445 may be configured as or otherwise support a means for receiving the data signal using a second transmit power that is based on the indicated power offset, where the first transmit power and the transmit power satisfy an average transmit power threshold.

In some examples, the power offset includes a first power offset, and the control message transmission component 1430 may be configured as or otherwise support a means for transmitting a second control message indicating at least one parameter associated with a second power offset associated with a symbol type that includes the data signal, the second power offset between the data signal of the symbol type and the reference signal that is associated with the data signal; and receiving, from the UE, the data signal and the reference signal according to the second indicated power offset.

In some examples, the at least one parameter associated with the power offset includes a first power offset, and the control message transmission component 1430 may be configured as or otherwise support a means for transmitting a second control message indicating an average power offset and statistical information associated with power offsets across the set of symbols within a fixed duration for the wireless connection. In some examples, the at least one parameter associated with the power offset includes a first power offset, and the signal transmission component 1450 may be configured as or otherwise support a means for transmitting the data signal and the reference signal based on the average power offset and the statistical information.

In some examples, the control message transmission component 1430 may be configured as or otherwise support a means for transmitting, for the TTI, one or more control signals indicating a power offset for the data signal of the set of symbols relative to an associated reference signal.

In some examples, to support transmitting the one or more control signals, the control message transmission component 1430 may be configured as or otherwise support a means for transmitting, for each symbol of the set of symbols, a control signal of the one or more control signals indicating an associated power offset for the symbol.

In some examples, to support transmitting the one or more control signals, the control message transmission component 1430 may be configured as or otherwise support a means for transmitting one control signal indicating a power offset applicable for the set of symbols of the TTI.

In some examples, the control message transmission component 1430 may be configured as or otherwise support a means for transmitting a second control message indicating a power offset threshold associated with a symbol type that includes the data signal, where the data signal and the reference signal are communicated according to the power offset using the set of symbols based on the power offset satisfying the power offset threshold.

In some examples, the control message transmission component 1430 may be configured as or otherwise support a means for transmitting a set of control messages indicating a respective set of power offsets, each power offset associated with a different symbol type of a set of symbol types, where the data signal is a first symbol type of the set of symbol types and the power offset is a first power offset of the set of power offsets that is associated with the first symbol type.

In some examples, to support transmitting the control message indicating the at least one parameter associated with the power offset, the control message transmission component 1430 may be configured as or otherwise support a means for transmitting an indication of whether the UE is to use the power offset between the data signal and the reference signal associated with the data signal.

Figure 15:
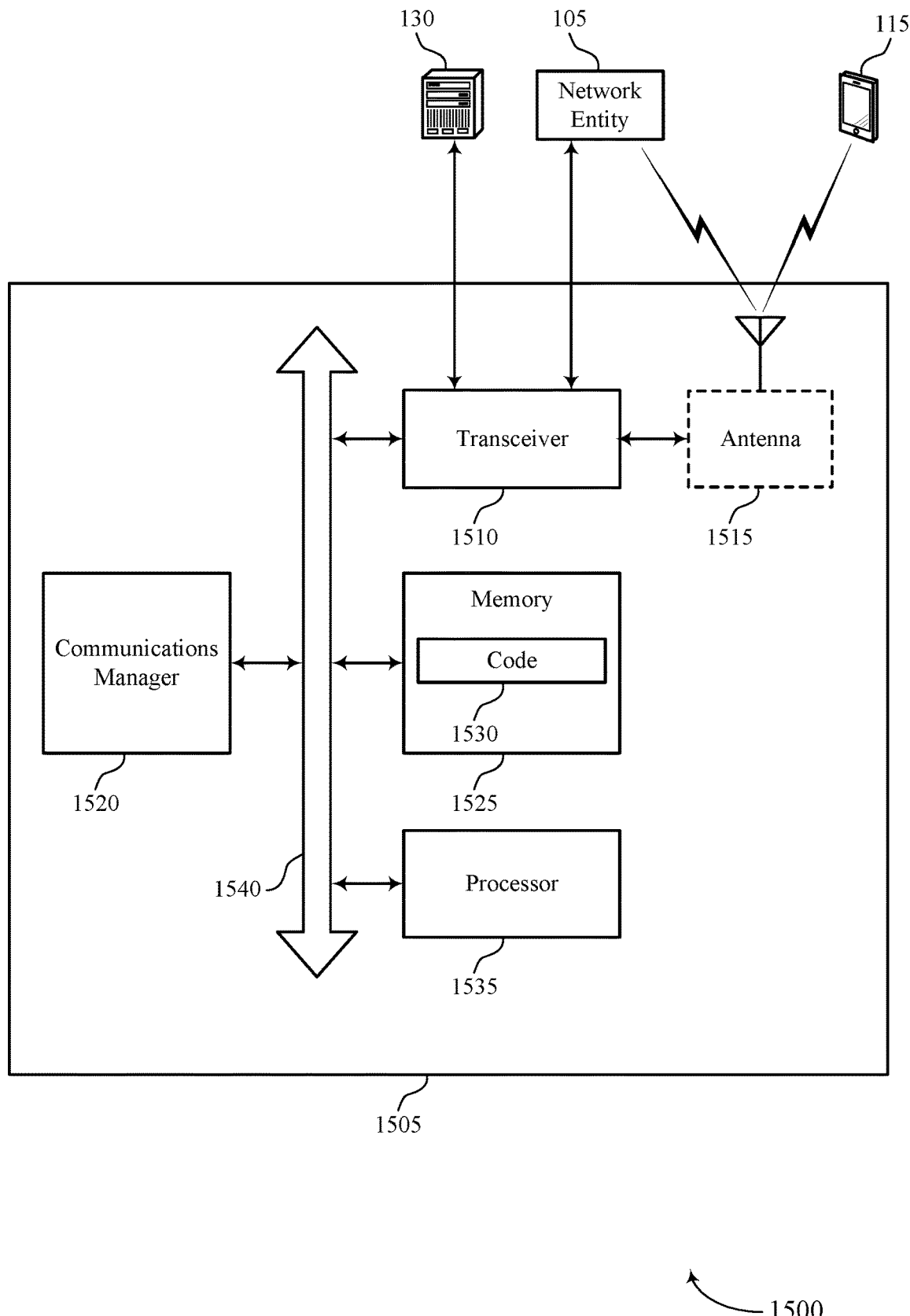
FIG. 15 shows a diagram of a system including a device that supports signaling a power offset between reference and data tones in accordance with one or more aspects of the present disclosure.

FIG. 15 shows a diagram of a system 1500 including a device 1505 that supports signaling a power offset between reference and data tones in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting signaling a power offset between reference and data tones). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for establishing, with a UE, a wireless connection that uses a set of symbols per TTI for OFDM communications, where each symbol of the set of symbols corresponds to an FFT window and includes a guard interval portion and a data portion within the FFT window. The communications manager 1520 may be configured as or otherwise support a means for transmitting a control message indicating at least one parameter associated with a power offset between a data signal of the set of symbols and a reference signal of the set of symbols that is associated with the data signal. The communications manager 1520 may be configured as or otherwise support a means for communicating, with the UE, the data signal, and the reference signal according to the indicated power offset using the set of symbols.

By including or configuring the communications manager 1520 in accordance with examples as described herein, the device 1505 may support techniques for power offset signaling between reference tones and data tones which may reduce processing, reduce power consumption, increase channel estimation quality, improve user experience related to reduced processing, improve coordination between devices, and result in a more efficient utilization of communication resources.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of signaling a power offset between reference and data tones as described herein, or the processor 1535 and the memory 1525 may be otherwise configured to perform or support such operations.

Figure 16:
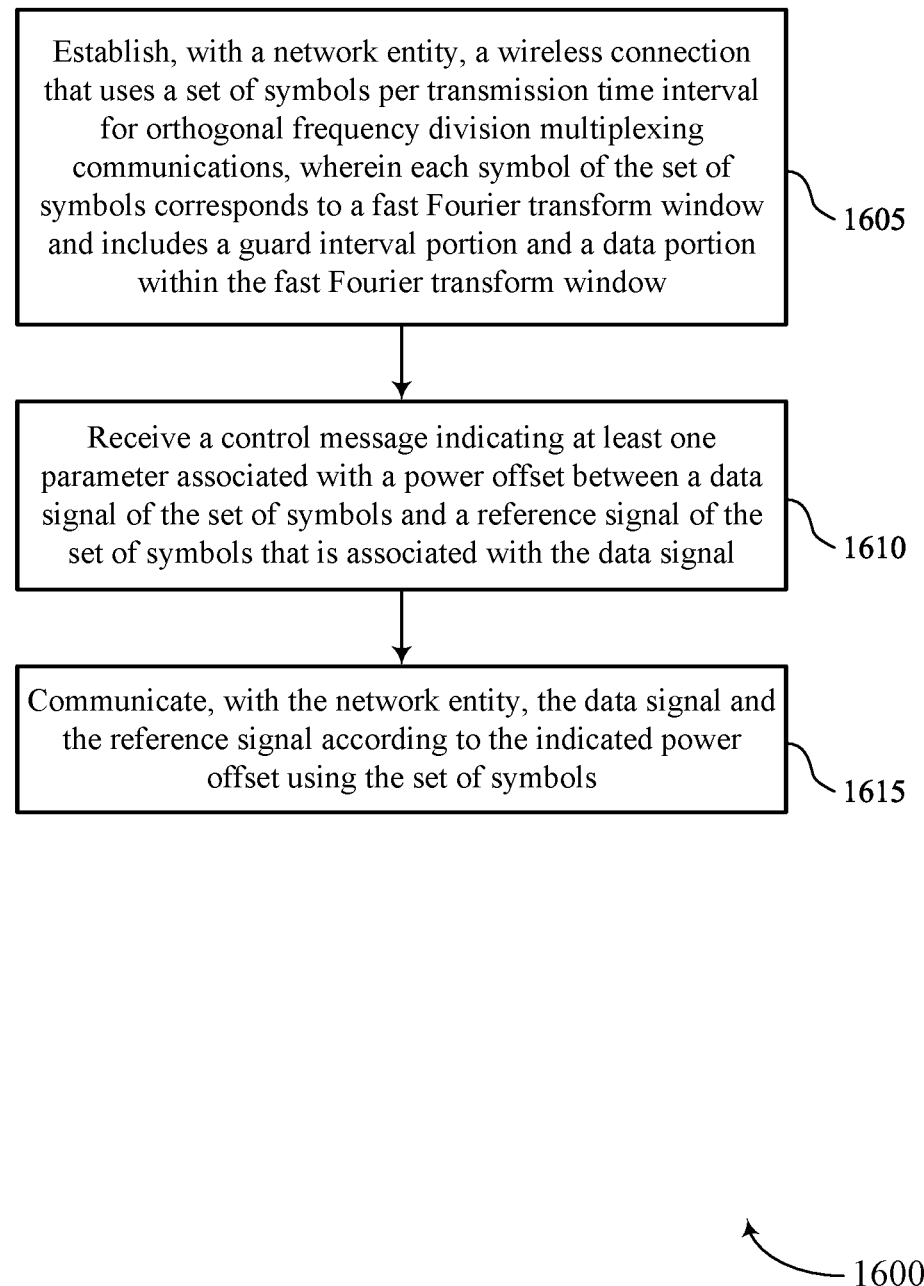
FIGS. 16 through 19 show flowcharts illustrating methods that support signaling a power offset between reference and data tones in accordance with one or more aspects of the present disclosure.

FIG. 16 shows a flowchart illustrating a method 1600 that supports signaling a power offset between reference and data tones in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include establishing, with a network entity, a wireless connection that uses a set of symbols per TTI for OFDM communications, where each symbol of the set of symbols corresponds to an FFT window and includes a guard interval portion and a data portion within the FFT window. The operations of 1605 may be performed in accordance with examples as disclosed herein. In some examples, aspects of the operations of 1605 may be performed by a wireless connection establishment component 1025 as described with reference to FIG. 10.

At 1610, the method may include receiving a control message indicating at least one parameter associated with a power offset between a data signal of the set of symbols and a reference signal of the set of symbols that is associated with the data signal. The operations of 1610 may be performed in accordance with examples as disclosed herein. In some examples, aspects of the operations of 1610 may be performed by a control message reception component 1030 as described with reference to FIG. 10.

At 1615, the method may include communicating, with the network entity, the data signal, and the reference signal according to the indicated power offset using the set of symbols. The operations of 1615 may be performed in accordance with examples as disclosed herein. In some examples, aspects of the operations of 1615 may be performed by a signal communication component 1035 as described with reference to FIG. 10.

Figure 17:
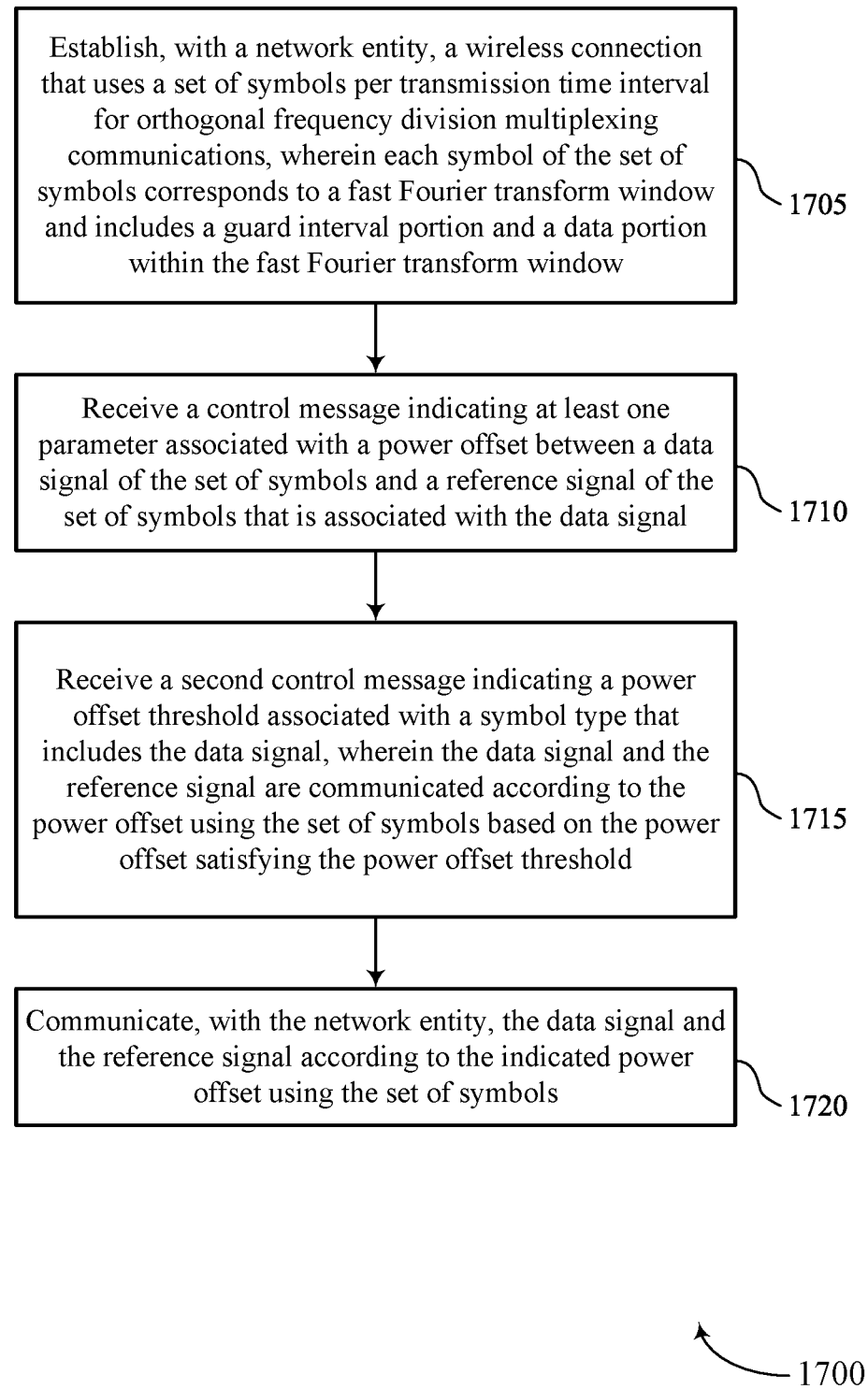

FIG. 17 shows a flowchart illustrating a method 1700 that supports signaling a power offset between reference and data tones in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include establishing, with a network entity, a wireless connection that uses a set of symbols per TTI for OFDM communications, where each symbol of the set of symbols corresponds to an FFT window and includes a guard interval portion and a data portion within the FFT window. The operations of 1705 may be performed in accordance with examples as disclosed herein. In some examples, aspects of the operations of 1705 may be performed by a wireless connection establishment component 1025 as described with reference to FIG. 10.

At 1710, the method may include receiving a control message indicating at least one parameter associated with a power offset between a data signal of the set of symbols and a reference signal of the set of symbols that is associated with the data signal. The operations of 1710 may be performed in accordance with examples as disclosed herein. In some examples, aspects of the operations of 1710 may be performed by a control message reception component 1030 as described with reference to FIG. 10.

At 1715, the method may include receiving a second control message indicating a power offset threshold associated with a symbol type that includes the data signal, where the data signal and the reference signal are communicated according to the power offset using the set of symbols based on the power offset satisfying the power offset threshold. The operations of 1715 may be performed in accordance with examples as disclosed herein. In some examples, aspects of the operations of 1715 may be performed by a control message reception component 1030 as described with reference to FIG. 10.

At 1720, the method may include communicating, with the network entity, the data signal, and the reference signal according to the indicated power offset using the set of symbols. The operations of 1720 may be performed in accordance with examples as disclosed herein. In some examples, aspects of the operations of 1720 may be performed by a signal communication component 1035 as described with reference to FIG. 10.

Figure 18:
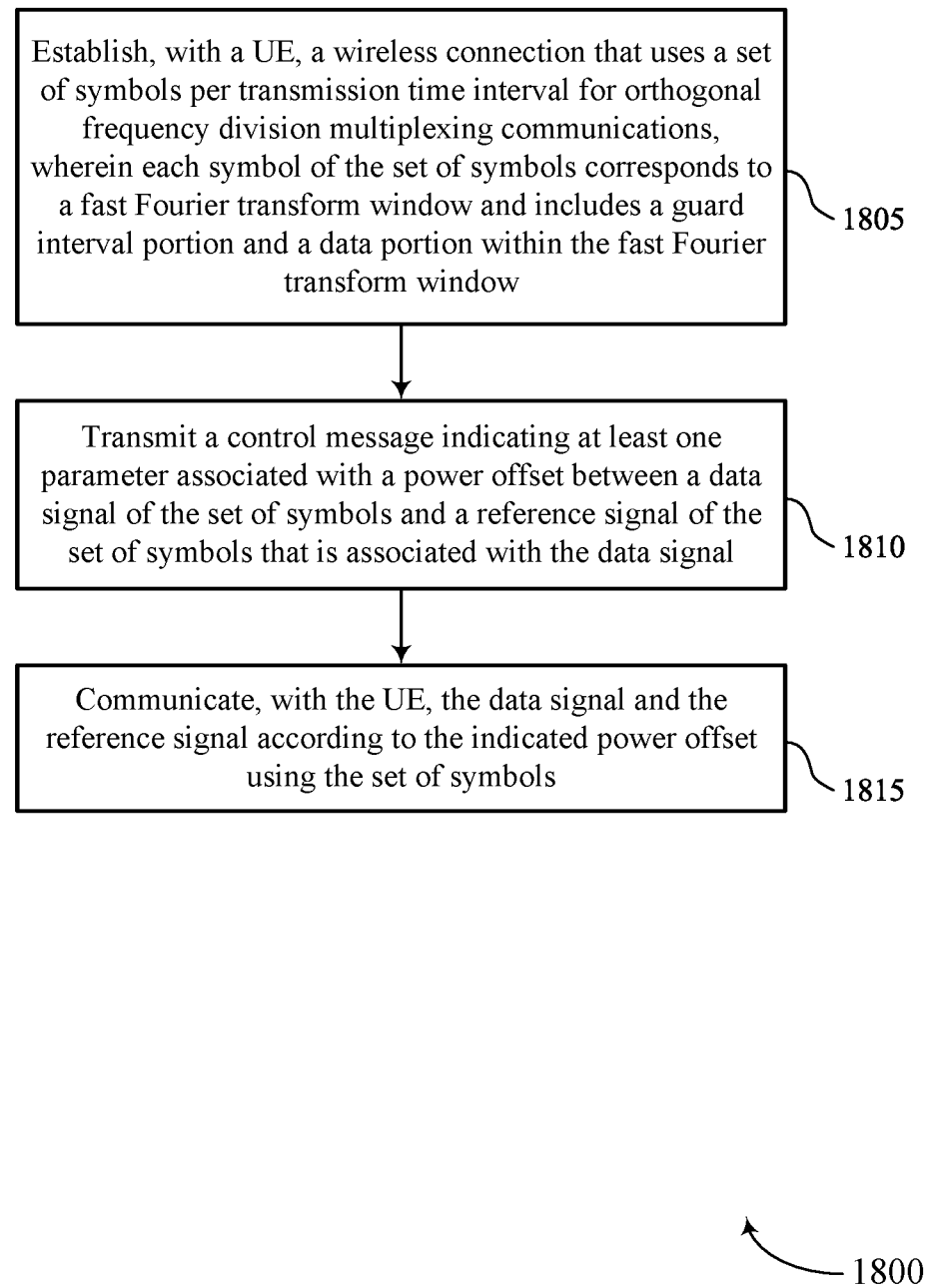

FIG. 18 shows a flowchart illustrating a method 1800 that supports signaling a power offset between reference and data tones in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include establishing, with a UE, a wireless connection that uses a set of symbols per TTI for OFDM communications, where each symbol of the set of symbols corresponds to an FFT window and includes a guard interval portion and a data portion within the FFT window. The operations of 1805 may be performed in accordance with examples as disclosed herein. In some examples, aspects of the operations of 1805 may be performed by a wireless connection establishment component 1425 as described with reference to FIG. 14.

At 1810, the method may include transmitting a control message indicating at least one parameter associated with a power offset between a data signal of the set of symbols and a reference signal of the set of symbols that is associated with the data signal. The operations of 1810 may be performed in accordance with examples as disclosed herein. In some examples, aspects of the operations of 1810 may be performed by a control message transmission component 1430 as described with reference to FIG. 14.

At 1815, the method may include communicating, with the UE, the data signal, and the reference signal according to the indicated power offset using the set of symbols. The operations of 1815 may be performed in accordance with examples as disclosed herein. In some examples, aspects of the operations of 1815 may be performed by a signal communication component 1435 as described with reference to FIG. 14.

Figure 19:
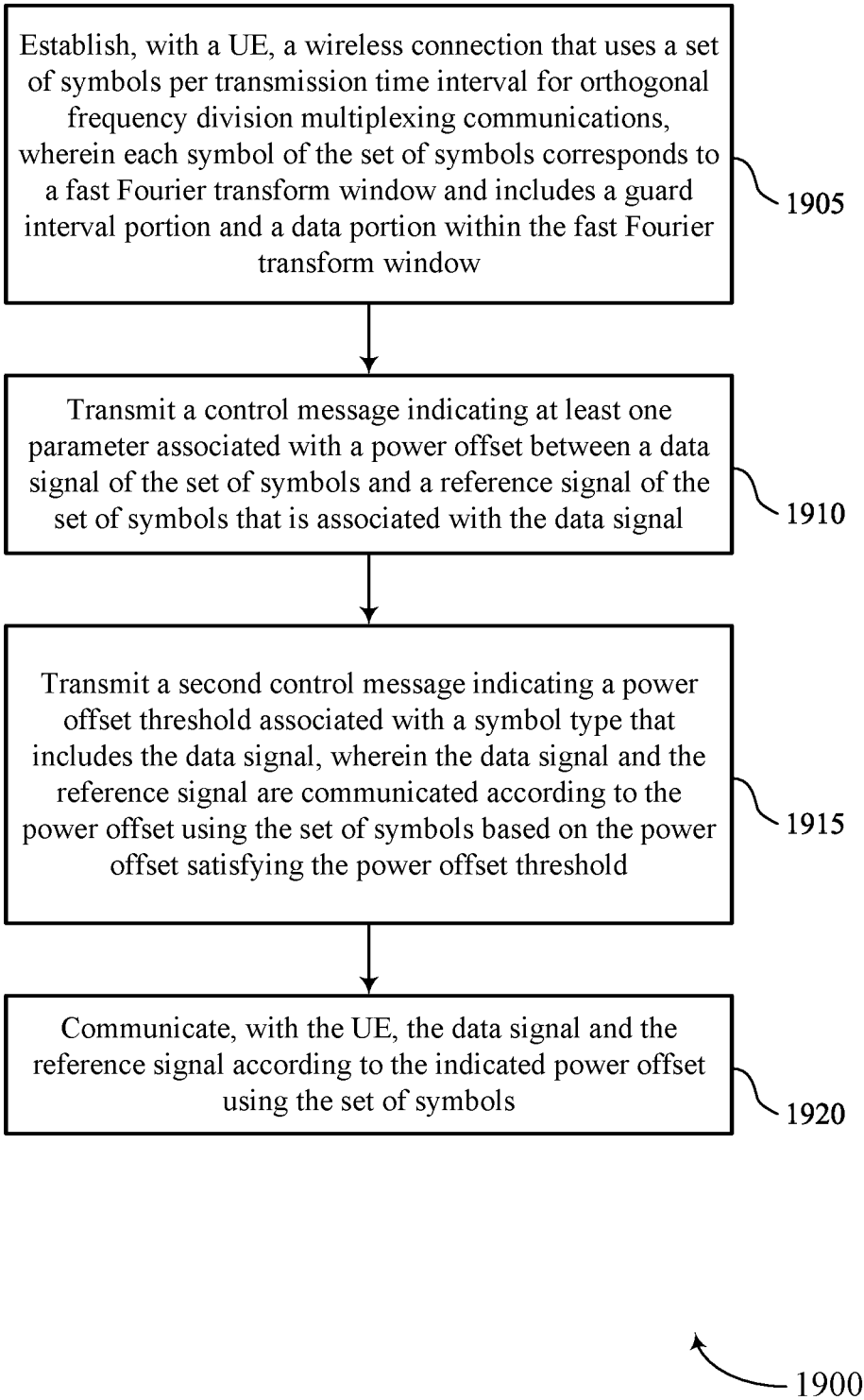

FIG. 19 shows a flowchart illustrating a method 1900 that supports signaling a power offset between reference and data tones in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include establishing, with a UE, a wireless connection that uses a set of symbols per TTI for OFDM communications, where each symbol of the set of symbols corresponds to an FFT window and includes a guard interval portion and a data portion within the FFT window. The operations of 1905 may be performed in accordance with examples as disclosed herein. In some examples, aspects of the operations of 1905 may be performed by a wireless connection establishment component 1425 as described with reference to FIG. 14.

At 1910, the method may include transmitting a control message indicating at least one parameter associated with a power offset between a data signal of the set of symbols and a reference signal of the set of symbols that is associated with the data signal. The operations of 1910 may be performed in accordance with examples as disclosed herein. In some examples, aspects of the operations of 1910 may be performed by a control message transmission component 1430 as described with reference to FIG. 14.

At 1915, the method may include transmitting a second control message indicating a power offset threshold associated with a symbol type that includes the data signal, where the data signal and the reference signal are communicated according to the power offset using the set of symbols based on the power offset satisfying the power offset threshold. The operations of 1915 may be performed in accordance with examples as disclosed herein. In some examples, aspects of the operations of 1915 may be performed by a control message transmission component 1430 as described with reference to FIG. 14.

At 1920, the method may include communicating, with the UE, the data signal, and the reference signal according to the indicated power offset using the set of symbols. The operations of 1920 may be performed in accordance with examples as disclosed herein. In some examples, aspects of the operations of 1920 may be performed by a signal communication component 1435 as described with reference to FIG. 14.

The following provides an overview of aspects of the present disclosure:

Aspect 1: A method for wireless communications at a UE, comprising: establishing, with a network entity, a wireless connection that uses a set of symbols per TTI for OFDM communications, wherein each symbol of the set of symbols corresponds to a FFT window and includes a GI portion and a data portion within the FFT window; receiving a control message indicating at least one parameter associated with a power offset between a data signal of the set of symbols and a reference signal of the set of symbols that is associated with the data signal; and communicating, with the network entity, the data signal and the reference signal according to the indicated power offset using the set of symbols.

Aspect 2: The method of aspect 1, wherein communicating the data signal and the reference signal further comprises: transmitting the reference signal using a first transmit power; and transmitting the data signal using a second transmit power that is based at least in part on the indicated power offset, wherein the first transmit power and the second transmit power satisfy a maximum transmit power threshold.

Aspect 3: The method of any of aspects 1 through 2, wherein the power offset comprises a first power offset, the method further comprising: receiving a second control message indicating at least one parameter associated with a second power offset associated with a symbol type that includes the data signal, the second power offset between the data signal of the symbol type and the reference signal that is associated with the data signal; and receiving, from the network entity, the data signal and the reference signal according to the second indicated power offset.

Aspect 4: The method of any of aspects 1 through 3, wherein the at least one parameter associated with the power offset comprises a first power offset, the method further comprising: receiving a second control message indicating an average power offset and statistical information associated with power offsets across the set of symbols within a fixed duration for the wireless connection; and receiving the data signal and the reference signal based at least in part on the average power offset and the statistical information.

Aspect 5: The method of any of aspects 1 through 4, further comprising: receiving, for the TTI, one or more control signals indicating a power offset for the data signal of the set of symbols relative to an associated reference signal.

Aspect 6: The method of aspect 5, wherein receiving the one or more control signals comprises: receiving, for each symbol of the set of symbols, a control signal of the one or more control signals indicating an associated power offset for the symbol.

Aspect 7: The method of aspect 6, wherein the control signal comprises a reference signal multiplexed in frequency or time with the data signal on a shared channel.

Aspect 8: The method of any of aspects 6 through 7, wherein the control signal is multiplexed in frequency or time with the data signal on a shared channel.

Aspect 9: The method of any of aspects 5 through 8, wherein receiving the one or more control signals comprises: receiving one control signal indicating a power offset applicable for the set of symbols of the TTI.

Aspect 10: The method of any of aspects 1 through 9, further comprising: receiving a second control message indicating a power offset threshold associated with a symbol type that includes the data signal, wherein the data signal and the reference signal are communicated according to the power offset using the set of symbols based at least in part on the power offset satisfying the power offset threshold.

Aspect 11: The method of any of aspects 1 through 10, further comprising: receiving a set of control messages indicating a respective set of power offsets, each power offset associated with a different symbol type of a set of symbol types, wherein the data signal is a first symbol type of the set of symbol types and the power offset is a first power offset of the set of power offsets that is associated with the first symbol type.

Aspect 12: The method of aspect 11, wherein the reference signal comprises a demodulation reference signal, and the set of symbol types comprise one or more of signals of a PDSCH, signals of a PDCCH, signals of a PUSCH, signals of a PUCCH, PRSs, or CSI-RSs.

Aspect 13: The method of any of aspects 1 through 12, wherein receiving the control message indicating the at least one parameter associated with the power offset comprises: receiving an indication of whether the UE is to use the power offset between the data signal and the reference signal associated with the data signal.

Aspect 14: The method of any of aspects 1 through 13, wherein receiving the control message comprises: receiving DCI, a MAC-CE, a RRC signal, or a combination thereof Aspect 15: The method of any of aspects 1 through 14, wherein the data signal comprises data tones in data symbols within the set of symbols and the reference signal comprises reference tones in reference symbols within the set of symbols, the reference symbols associated with the data symbols.

Aspect 16: A method for wireless communications at a network entity, comprising: establishing, with a UE, a wireless connection that uses a set of symbols per TTI for OFDM communications, wherein each symbol of the set of symbols corresponds to a FFT window and includes a GI portion and a data portion within the FFT window; transmitting a control message indicating at least one parameter associated with a power offset between a data signal of the set of symbols and a reference signal of the set of symbols that is associated with the data signal; and communicating, with the UE, the data signal and the reference signal according to the indicated power offset using the set of symbols.

Aspect 17: The method of aspect 16, wherein communicating the data signal and the reference signal further comprises: receiving the reference signal using a first transmit power; and receiving the data signal using a second transmit power that is based at least in part on the indicated power offset, wherein the first transmit power and the transmit power satisfy an average transmit power threshold.

Aspect 18: The method of any of aspects 16 through 17, wherein the power offset comprises a first power offset, the method further comprising: transmitting a second control message indicating at least one parameter associated with a second power offset associated with a symbol type that includes the data signal, the second power offset between the data signal of the symbol type and the reference signal that is associated with the data signal; and receiving, from the UE, the data signal and the reference signal according to the second indicated power offset.

Aspect 19: The method of any of aspects 16 through 18, wherein the at least one parameter associated with the power offset comprises a first power offset, the method further comprising: transmitting a second control message indicating an average power offset and statistical information associated with power offsets across the set of symbols within a fixed duration for the wireless connection; and transmitting the data signal and the reference signal based at least in part on the average power offset and the statistical information.

Aspect 20: The method of any of aspects 16 through 19, further comprising: transmitting, for the TTI, one or more control signals indicating a power offset for the data signal of the set of symbols relative to an associated reference signal.

Aspect 21: The method of aspect 20, wherein transmitting the one or more control signals comprises: transmitting, for each symbol of the set of symbols, a control signal of the one or more control signals indicating an associated power offset for the symbol.

Aspect 22: The method of any of aspects 20 through 21, wherein transmitting the one or more control signals comprises: transmitting one control signal indicating a power offset applicable for the set of symbols of the TTI.

Aspect 23: The method of any of aspects 16 through 22, further comprising: transmitting a second control message indicating a power offset threshold associated with a symbol type that includes the data signal, wherein the data signal and the reference signal are communicated according to the power offset using the set of symbols based at least in part on the power offset satisfying the power offset threshold.

Aspect 24: The method of any of aspects 16 through 23, further comprising: transmitting a set of control messages indicating a respective set of power offsets, each power offset associated with a different symbol type of a set of symbol types, wherein the data signal is a first symbol type of the set of symbol types and the power offset is a first power offset of the set of power offsets that is associated with the first symbol type.

Aspect 25: The method of any of aspects 16 through 24, wherein transmitting the control message indicating the at least one parameter associated with the power offset comprises: transmitting an indication of whether the UE is to use the power offset between the data signal and the reference signal associated with the data signal.

Aspect 26: An apparatus for wireless communications at a UE, comprising a processor; memory coupled with the processor; and instructions stored in the memory and executable by the processor to cause the apparatus to perform a method of any of aspects 1 through 15.

Aspect 27: An apparatus for wireless communications at a UE, comprising at least one means for performing a method of any of aspects 1 through 15.

Aspect 28: A non-transitory computer-readable medium storing code for wireless communications at a UE, the code comprising instructions executable by a processor to perform a method of any of aspects 1 through 15.

Aspect 29: An apparatus for wireless communications at a network entity, comprising a processor; memory coupled with the processor; and instructions stored in the memory and executable by the processor to cause the apparatus to perform a method of any of aspects 16 through 25.

Aspect 30: An apparatus for wireless communications at a network entity, comprising at least one means for performing a method of any of aspects 16 through 25.

Aspect 31: A non-transitory computer-readable medium storing code for wireless communications at a network entity, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    establishing, with a network entity, a wireless connection that uses a set of symbols per transmission time interval for orthogonal frequency division multiplexing communications, wherein each symbol of the set of symbols corresponds to a fast Fourier transform window and includes a guard interval portion and a data portion within the fast Fourier transform window;
    receiving a control message indicating at least one parameter associated with a power offset between a data signal of the set of symbols and a reference signal of the set of symbols that is associated with the data signal; and
    communicating, with the network entity, the data signal and the reference signal according to the indicated power offset using the set of symbols.

2. The method of claim 1, wherein communicating the data signal and the reference signal further comprises:
    transmitting the reference signal using a first transmit power; and
    transmitting the data signal using a second transmit power that is based at least in part on the indicated power offset, wherein the first transmit power and the second transmit power satisfy a maximum transmit power threshold.

3. The method of claim 1, wherein the power offset comprises a first power offset, the method further comprising:
    receiving a second control message indicating at least one parameter associated with a second power offset associated with a symbol type that includes the data signal, the second power offset between the data signal of the symbol type and the reference signal that is associated with the data signal; and
    receiving, from the network entity, the data signal and the reference signal according to the second indicated power offset.

4. The method of claim 1, wherein the at least one parameter associated with the power offset comprises a first power offset, the method further comprising:
    receiving a second control message indicating an average power offset and statistical information associated with power offsets across the set of symbols within a fixed duration for the wireless connection; and
    receiving the data signal and the reference signal based at least in part on the average power offset and the statistical information.

5. The method of claim 1, further comprising:
    receiving, for the transmission time interval, one or more control signals indicating a power offset for the data signal of the set of symbols relative to an associated reference signal.

6. The method of claim 5, wherein receiving the one or more control signals comprises:
    receiving, for each symbol of the set of symbols, a control signal of the one or more control signals indicating an associated power offset for the symbol.

7. The method of claim 6, wherein the control signal comprises a reference signal multiplexed in frequency or time with the data signal on a shared channel.

8. The method of claim 6, wherein the control signal is multiplexed in frequency or time with the data signal on a shared channel.

9. The method of claim 5, wherein receiving the one or more control signals comprises:
    receiving one control signal indicating a power offset applicable for the set of symbols of the transmission time interval.

10. The method of claim 1, further comprising:
    receiving a second control message indicating a power offset threshold associated with a symbol type that includes the data signal, wherein the data signal and the reference signal are communicated according to the power offset using the set of symbols based at least in part on the power offset satisfying the power offset threshold.

11. The method of claim 1, further comprising:
    receiving a set of control messages indicating a respective set of power offsets, each power offset associated with a different symbol type of a set of symbol types, wherein the data signal is a first symbol type of the set of symbol types and the power offset is a first power offset of the set of power offsets that is associated with the first symbol type.

12. The method of claim 11, wherein the reference signal comprises a demodulation reference signal, and the set of symbol types comprises one or more of signals of a physical downlink shared channel, signals of a physical downlink control channel, signals of a physical uplink shared channel, signals of a physical uplink control channel, position reference signals, or channel state information reference signals.

13. The method of claim 1, wherein receiving the control message indicating the at least one parameter associated with the power offset comprises:
receiving an indication of whether the UE is to use the power offset between the data signal and the reference signal associated with the data signal.

14. The method of claim 1, wherein receiving the control message comprises:
receiving downlink control information, a medium access control control element, a radio resource control signal, or a combination thereof.

15. The method of claim 1, wherein the data signal comprises data tones in data symbols within the set of symbols and the reference signal comprises reference tones in reference symbols within the set of symbols, the reference symbols associated with the data symbols.

16. A method for wireless communications at a network entity, comprising:
establishing, with a user equipment (UE), a wireless connection that uses a set of symbols per transmission time interval for orthogonal frequency division multiplexing communications, wherein each symbol of the set of symbols corresponds to a fast Fourier transform window and includes a guard interval portion and a data portion within the fast Fourier transform window;
transmitting a control message indicating at least one parameter associated with a power offset between a data signal of the set of symbols and a reference signal of the set of symbols that is associated with the data signal; and
communicating, with the UE, the data signal and the reference signal according to the indicated power offset using the set of symbols.

17. The method of claim 16, wherein communicating the data signal and the reference signal further comprises:
receiving the reference signal using a first transmit power; and
receiving the data signal using a second transmit power that is based at least in part on the indicated power offset, wherein the first transmit power and the transmit power satisfy an average transmit power threshold.

18. The method of claim 16, wherein the power offset comprises a first power offset, the method further comprising:
transmitting a second control message indicating at least one parameter associated with a second power offset associated with a symbol type that includes the data signal, the second power offset between the data signal of the symbol type and the reference signal that is associated with the data signal; and receiving, from the UE, the data signal and the reference signal according to the second indicated power offset.

19. The method of claim 16, wherein the at least one parameter associated with the power offset comprises a first power offset, the method further comprising:
transmitting a second control message indicating an average power offset and statistical information associated with power offsets across the set of symbols within a fixed duration for the wireless connection; and
transmitting the data signal and the reference signal based at least in part on the average power offset and the statistical information.

20. The method of claim 16, further comprising:
transmitting, for the transmission time interval, one or more control signals indicating a power offset for the data signal of the set of symbols relative to an associated reference signal.

21. The method of claim 20, wherein transmitting the one or more control signals comprises:
transmitting, for each symbol of the set of symbols, a control signal of the one or more control signals indicating an associated power offset for the symbol.

22. The method of claim 20, wherein transmitting the one or more control signals comprises:
transmitting one control signal indicating a power offset applicable for the set of symbols of the transmission time interval.

23. The method of claim 16, further comprising:
transmitting a second control message indicating a power offset threshold associated with a symbol type that includes the data signal, wherein the data signal and the reference signal are communicated according to the power offset using the set of symbols based at least in part on the power offset satisfying the power offset threshold.

24. The method of claim 16, further comprising:
transmitting a set of control messages indicating a respective set of power offsets, each power offset associated with a different symbol type of a set of symbol types, wherein the data signal is a first symbol type of the set of symbol types and the power offset is a first power offset of the set of power offsets that is associated with the first symbol type.

25. The method of claim 16, wherein transmitting the control message indicating the at least one parameter associated with the power offset comprises:
transmitting an indication of whether the UE is to use the power offset between the data signal and the reference signal associated with the data signal.

26. An apparatus for wireless communications at a user equipment (UE), comprising:
a processor;
memory in electronic communication with the processor; and
instructions stored in the memory, wherein the instructions are executable by the processor to:
establish, with a network entity, a wireless connection that uses a set of symbols per transmission time interval for orthogonal frequency division multiplexing communications, wherein each symbol of the set of symbols corresponds to a fast Fourier transform window and includes a guard interval portion and a data portion within the fast Fourier transform window;
receive a control message indicating at least one parameter associated with a power offset between a data signal of the set of symbols and a reference signal of the set of symbols that is associated with the data signal; and
communicate, with the network entity, the data signal and the reference signal according to the indicated power offset using the set of symbols.

27. The apparatus of claim 26, wherein the instructions executable by the processor to communicate the data signal and the reference signal comprise instructions executable by the processor to:
- transmit the reference signal using a first transmit power; and
- transmit the data signal using a second transmit power that is based at least in part on the indicated power offset, wherein the first transmit power and the second transmit power satisfy a maximum transmit power threshold.

28. The apparatus of claim 26, wherein the power offset comprises a first power offset, and the instructions are further executable by the processor to:
- receive a second control message indicating at least one parameter associated with a second power offset associated with a symbol type that includes the data signal, the second power offset between the data signal of the symbol type and the reference signal that is associated with the data signal; and
- receive, from the network entity, the data signal and the reference signal according to the second indicated power offset.

29. An apparatus for wireless communications at a network entity, comprising:
- a processor;
- memory in electronic communication with the processor; and
- instructions stored in the memory, wherein the instructions are executable by the processor to:
  - establish, with a user equipment (UE), a wireless connection that uses a set of symbols per transmission time interval for orthogonal frequency division multiplexing communications, wherein each symbol of the set of symbols corresponds to a fast Fourier transform window and includes a guard interval portion and a data portion within the fast Fourier transform window;
  - transmit a control message indicating at least one parameter associated with a power offset between a data signal of the set of symbols and a reference signal of the set of symbols that is associated with the data signal; and
  - communicate, with the UE, the data signal and the reference signal according to the indicated power offset using the set of symbols.

30. The apparatus of claim 29, wherein the instructions executable by the processor to communicate the data signal and the reference signal comprise instructions executable by the processor to:
- receive the reference signal using a first transmit power; and
- receive the data signal using a second transmit power that is based at least in part on the indicated power offset, wherein the first transmit power and the transmit power satisfy an average transmit power threshold.

* * * * *